United States Patent
Song et al.

(10) Patent No.: US 11,117,307 B2
(45) Date of Patent: Sep. 14, 2021

(54) SYSTEMS AND METHODS FOR MAKING COMPOSITE STRUCTURES

(71) Applicant: The Boeing Company, Chicago, IL (US)

(72) Inventors: Weidong Song, Woodinville, WA (US); Daniel J. Perron, Federal Way, WA (US); Stephen G. Moore, Renton, WA (US); Jamie J. Langabeer, Everett, WA (US); Jonathan D. Robbins, Snohomish, WA (US); Jeffrey Olberg, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 220 days.

(21) Appl. No.: 16/255,724

(22) Filed: Jan. 23, 2019

(65) Prior Publication Data

US 2019/0152120 A1    May 23, 2019

Related U.S. Application Data

(62) Division of application No. 14/812,223, filed on Jul. 29, 2015, now Pat. No. 10,195,779.

(51) Int. Cl.
*B29C 48/155*    (2019.01)
*B29C 48/25*    (2019.01)
(Continued)

(52) U.S. Cl.
CPC .............. *B29C 48/92* (2019.02); *B29C 48/02* (2019.02); *B29C 48/155* (2019.02);
(Continued)

(58) Field of Classification Search
CPC .................... B29C 44/18; B29C 48/02; B29C 2948/92571
(Continued)

(56) References Cited

U.S. PATENT DOCUMENTS 5,358,397 A * 10/1994 Ligon ..................... B30B 11/24
425/145
6,681,151 B1 * 1/2004 Weinzimmer ......... B25J 9/1697
219/121.85
(Continued)

OTHER PUBLICATIONS

Sathishkumar, "A hybrid fiber reinforced polymer composites—a review." Journal of Reinforced Plastics and Composites 2014, vol. 33(5) 454-471 (Year: 2014).*
(Continued)

*Primary Examiner* — Matthew J Daniels
*Assistant Examiner* — Hana C Page
(74) *Attorney, Agent, or Firm* — Haynes and Boone, LLP

(57) ABSTRACT

A system for depositing a composite filler material into a channel of a composite structure includes an end-effector configured to extrude a bead of the filler material into the channel. The filler material can comprise a first group of relatively long fibers, a second group of relatively short fibers and a resin. A drive system is configured to move the end-effector relative to the channel, and a position sensor is configured to detect the position of the bead relative to the channel. A controller is configured to operate the drive system in response to the detected position and to operate the end-effector to heat and compress the filler material so as to orient the longer fibers in a substantially longitudinal direction relative to the channel and the shorter fibers in substantially random directions relative to the channel when the bead is extruded into the channel.

25 Claims, 24 Drawing Sheets

(51) Int. Cl.

| | |
|---|---|
| *B29C 48/385* | (2019.01) |
| *B29C 48/92* | (2019.01) |
| *B64C 1/06* | (2006.01) |
| *B29D 99/00* | (2010.01) |
| *B29C 48/02* | (2019.01) |
| *B29L 31/30* | (2006.01) |
| *B29K 105/16* | (2006.01) |
| *B29K 105/12* | (2006.01) |
| *B29C 65/00* | (2006.01) |
| *B29C 65/02* | (2006.01) |
| *B64C 1/00* | (2006.01) |
| *B29C 48/05* | (2019.01) |
| *B29C 48/06* | (2019.01) |
| *B29C 48/00* | (2019.01) |
| *B29C 48/14* | (2019.01) |
| *B29C 48/285* | (2019.01) |
| *B29C 48/76* | (2019.01) |
| *B29C 48/793* | (2019.01) |
| *B29C 48/80* | (2019.01) |

(52) U.S. Cl.
CPC .......... *B29D 99/0003* (2013.01); *B64C 1/064* (2013.01); *B29C 48/0021* (2019.02); *B29C 48/05* (2019.02); *B29C 48/06* (2019.02); *B29C 48/145* (2019.02); *B29C 48/266* (2019.02); *B29C 48/2886* (2019.02); *B29C 48/385* (2019.02); *B29C 48/767* (2019.02); *B29C 48/793* (2019.02); *B29C 48/832* (2019.02); *B29C 65/02* (2013.01); *B29C 66/112* (2013.01); *B29C 66/1122* (2013.01); *B29C 66/131* (2013.01); *B29C 66/43441* (2013.01); *B29C 66/474* (2013.01); *B29C 66/496* (2013.01); *B29C 66/524* (2013.01); *B29C 66/5326* (2013.01); *B29C 66/54* (2013.01); *B29C 66/636* (2013.01); *B29C 66/721* (2013.01); *B29C 66/73754* (2013.01); *B29C 2791/006* (2013.01); *B29C 2948/926* (2019.02); *B29C 2948/92076* (2019.02); *B29C 2948/92104* (2019.02); *B29C 2948/92114* (2019.02); *B29C 2948/92209* (2019.02); *B29C 2948/92514* (2019.02); *B29C 2948/92571* (2019.02); *B29C 2948/92609* (2019.02); *B29C 2948/92704* (2019.02); *B29C 2948/92904* (2019.02); *B29K 2105/12* (2013.01); *B29K 2105/16* (2013.01); *B29K 2105/165* (2013.01); *B29L 2031/3076* (2013.01); *B29L 2031/3082* (2013.01); *B29L 2031/3085* (2013.01); *B64C 2001/0072* (2013.01); *Y02T 50/40* (2013.01)

(58) Field of Classification Search
USPC ....................................................... 264/40.7
See application file for complete search history.

(56) References Cited

U.S. PATENT DOCUMENTS

| | | |
|---|---|---|
| 9,205,027 B2 | 12/2015 | Kessler |
| 2010/0116199 A1 | 5/2010 | Fork |
| 2012/0047761 A1 | 3/2012 | Lou |
| 2012/0074265 A1* | 3/2012 | Hallander ............... B29C 65/02 |
| | | 244/90 R |
| 2012/0261059 A1* | 10/2012 | Sherwood ......... B05C 17/00596 |
| | | 156/182 |
| 2013/0334722 A1 | 12/2013 | Kitamura |
| 2014/0265040 A1 | 9/2014 | Batchelder |
| 2016/0038655 A1 | 2/2016 | Weisman |
| 2016/0200024 A1 | 7/2016 | Kim |
| 2016/0250847 A1 | 9/2016 | Gengrinovich |
| 2016/0257051 A1 | 9/2016 | Pappas |
| 2016/0271871 A1 | 9/2016 | Lee |
| 2017/0113394 A1* | 4/2017 | Kobayashi ............. B29B 7/845 |

OTHER PUBLICATIONS

Alec. "Artis develops giant KUKA robot, a 100 cubic meter CNC machine & 3D printer in one," Feb. 2015 (Year: 2015).*
Plastic Processing Overview [online]. ConairGroup, You Tube, Jul. 31, 2013 [retrieved on Jul. 23, 2015]. Retrieved from the Internet: <URL: https://www.youtube.com/watch?y=43LgedAH-Kk>.
Rosato et al. Injection Molding Handbook. Springer Science+Business Media, Published 2000.
Alec, Artis develops giant KUKA robot, a 100 cubic meter CNC machine & 3D printer in one: Feb. 2015 <http://www.3ders.org/articles/20150220-artis-develops-giant-KUKA-robot-a-100-cubic-meter-cnc-machine-3d-printer-in-one.html>.
Manura, "Part III: Charcoal Exhaust Traps." Apr. 2000 <http://www.sisweb.com/reference/appinote/app-84.html>.

* cited by examiner

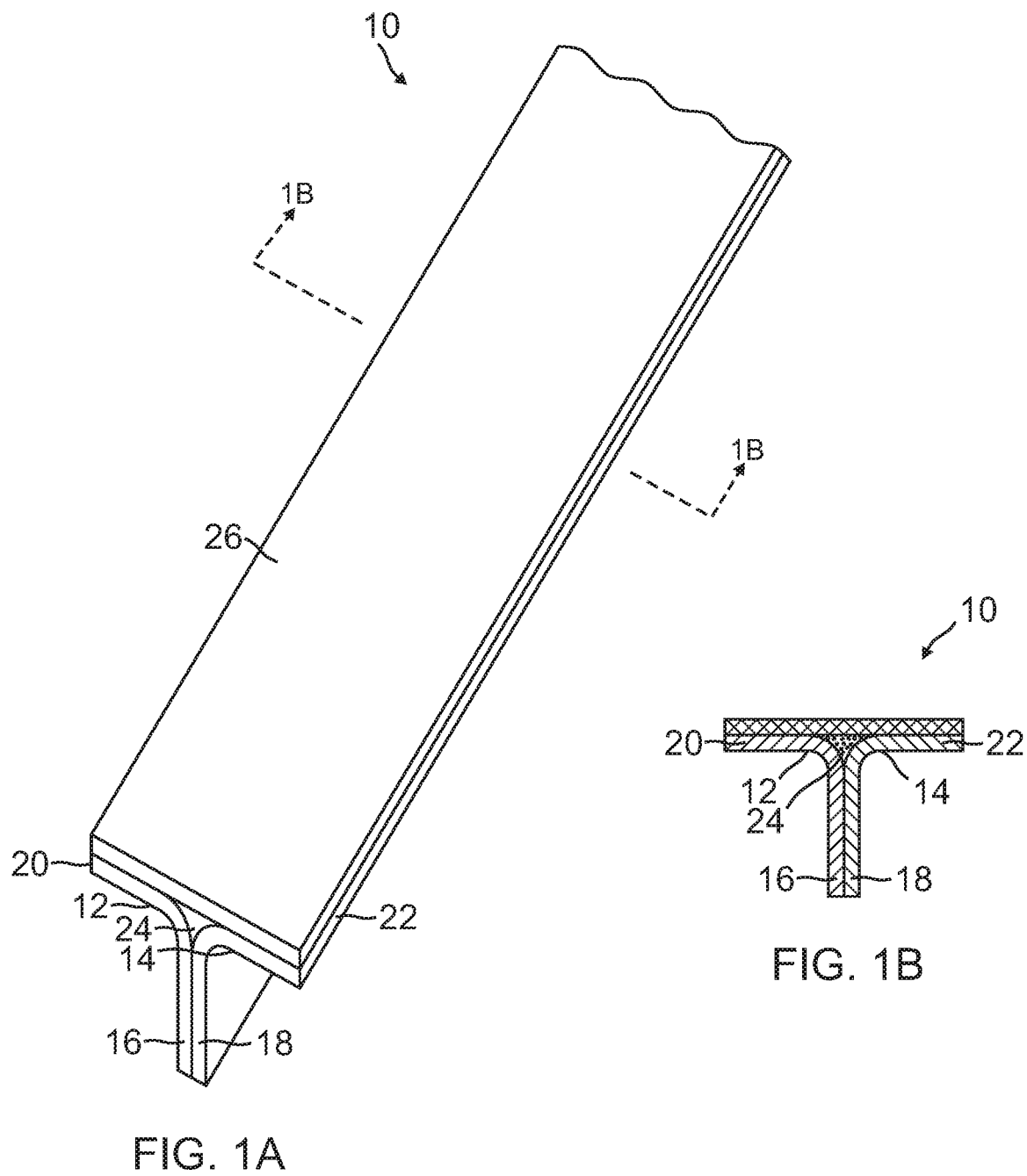

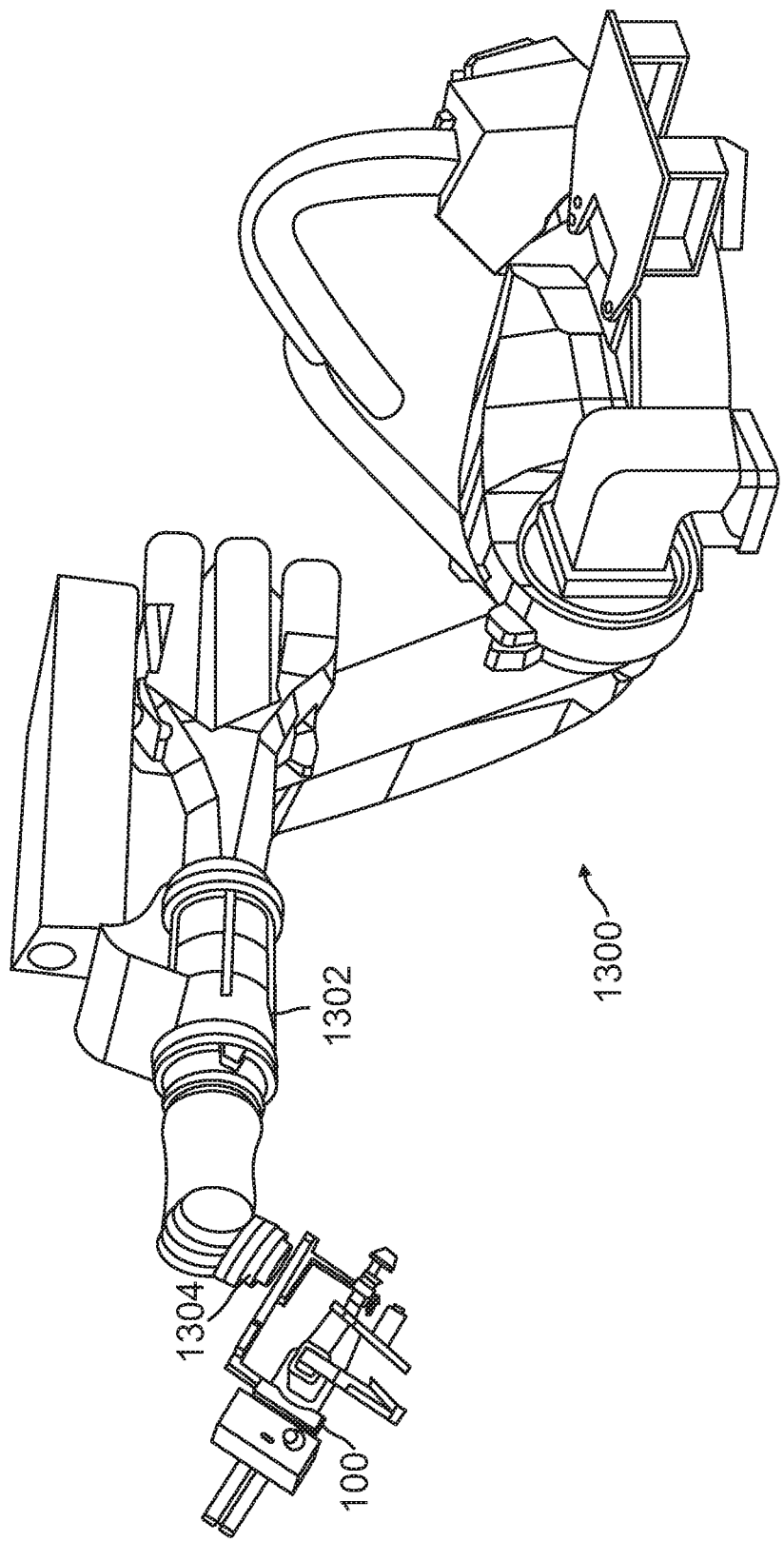

SYSTEMS AND METHODS FOR MAKING COMPOSITE STRUCTURES

CROSS-REFERENCE TO RELATED APPLICATIONS

This application is a divisional of U.S. patent application Ser. No. 14/812,223 filed Jul. 29, 2015, the entirety of which is incorporated herein by reference.

BACKGROUND

1. Technical Field

This disclosure generally relates to manufacturing systems and methods, and more particularly, to systems and methods for making composite structures, e.g., composite aircraft structures.

2. Related Art

The recent advent of aircraft with composite airframes, i.e., fiber-reinforced polymer or resin airframes, has prompted the need for systems and methods for fabricating composite structural elements of such airframes, e.g., the skins, spars, ribs, frames, and stringers thereof.

As an example, longerons, frames, "stringers" or "stiffeners," and other aircraft structural elements can be fabricated from flat composite ply layups. To stiffen them, they can be provided with complex cross-sectional shapes, e.g., an "L", "U", "Onion", "hat", "I", "T", "J", "Z" or the like, cross-sectional shape, depending on, among other things, the type and amount of load the structural element is designed to carry. The composite cross sectional shapes noted above can be folded to form portions of the cross section but leave voids where the folds meet the other elements of the composite section.

In one of only many possible embodiments thereof, a composite structure can be fabricated by abutting the legs of two composite structural members so as to form groove or channel at their junction, then filling the channel with a structure called a noodle so as to join the two elements together. It is desirable to automate the fabrication procedure, particularly the channel-filling step, with systems and methods that enable composite structures to be produced rapidly, accurately, repeatably, and with a minimum of manual labor, thereby resulting in composite structures that are not only strong and reliable, but cost-effective as well.

SUMMARY

In accordance with embodiments of the present disclosure, various systems and methods are provided for making composite structures accurately, reliably, repeatably, and with a minimum of manual labor, thereby resulting in composite structures that are structurally robust and reliable, yet cost-effective. In particular, composite structures may be manufactured from a filler material that includes first and second groups of fibers of different lengths. Such manufacturing may be performed in a manner that orients a first group of fibers in a substantially longitudinal direction of the composite structure, and that orients a second group of fibers in substantially random directions, thus improving overall strength and resilience of the composite structure.

In one example embodiment, a system configured to in-situ fabricate a composite structure in a channel comprises an end-effector configured to extrude a bead of a filler material into the channel to form the composite structure. In one advantageous embodiment, the filler material can comprise a first group of fibers having a first length, a second group of fibers having a second length shorter than the first length, and a resin. The system can also include a drive system configured to move the end-effector relative to the channel, a position sensor configured to detect a position of the bead relative to the channel, and a controller configured to operate the drive system in response to the detected position, and to operate the end-effector so as to heat and compress the filler material, to orient the first group of fibers in a substantially longitudinal direction relative to the channel, and to orient the second group of fibers in substantially random directions relative to the channel when the bead is extruded into the channel.

In another example embodiment, a method of in-situ fabricating a composite structure in a channel comprises receiving a filler material at an end-effector, wherein the filler material comprises a first group of fibers having a first length, a second group of fibers having a second length shorter than the first length, and a resin. The end-effector is operated so as to orient the first group of fibers in a substantially longitudinal direction relative to the channel when extruded from the end-effector, and to orient the second group of fibers in substantially random directions relative to the channel when extruded from the end-effector. A bead of the oriented filler material is extruded from the end-effector into the channel, and the end-effector is moved relative to the channel during the extruding to form the composite structure. A position of the bead relative to the channel is detected, and the extruding and the moving are selectively adjusted in response to the detected position.

In another example embodiment, a method of in-situ fabricating a composite structure comprises receiving a material at an end-effector. The material comprises a first group of fibers having a first length, a second group of fibers having a second length shorter than the first length, and a resin. The end-effector is operated to orient the first group of fibers in a substantially longitudinal direction relative to the channel when extruded from the end-effector and orient the second group of fibers in substantially random directions when extruded from the end-effector. A bead of the oriented filler material is extruded from the end-effector onto a workpiece. The end-effector is moved relative to the workpiece during the extruding to form the composite structure. A position of the bead relative to the composite structure is detected, and the extruding and the moving are selectively adjusted in response to the detected position.

Embodiments of the disclosure enable voids or channels between adjacent composite structural elements to be filled with a composite filler material rapidly, precisely, repeatably, and with a minimum amount of manual labor, thereby resulting in reliable, cost-effective composite structures useful in, for example, composite-bodied aircraft.

The scope of the invention is defined by the claims, which are incorporated into this section by reference. A better understanding of the systems and methods for making composite structures of the present disclosure, as well as an appreciation of the above and additional advantages thereof, will be afforded to those of skill in the art by a consideration of the following detailed description of one or more example embodiments thereof. In this description, reference is made to the various views of the appended sheets of drawings, which are briefly described below, and within which, like reference numerals are used to identify like ones of the elements illustrated therein.

BRIEF DESCRIPTION OF THE DRAWINGS

FIG. 1A is a perspective end view of an example embodiment of a composite structure;

FIG. 1B is a cross-section view of the composite structure of FIG. 1A, as seen along the lines of the section 1B-1B taken therein;

FIG. 13 is a perspective side elevation view of a robot having an arm with a distal end that is movable by the robot with six degrees of freedom, showing the end-effector disposed at the distal end thereof;

DETAILED DESCRIPTION

Figure 2A:
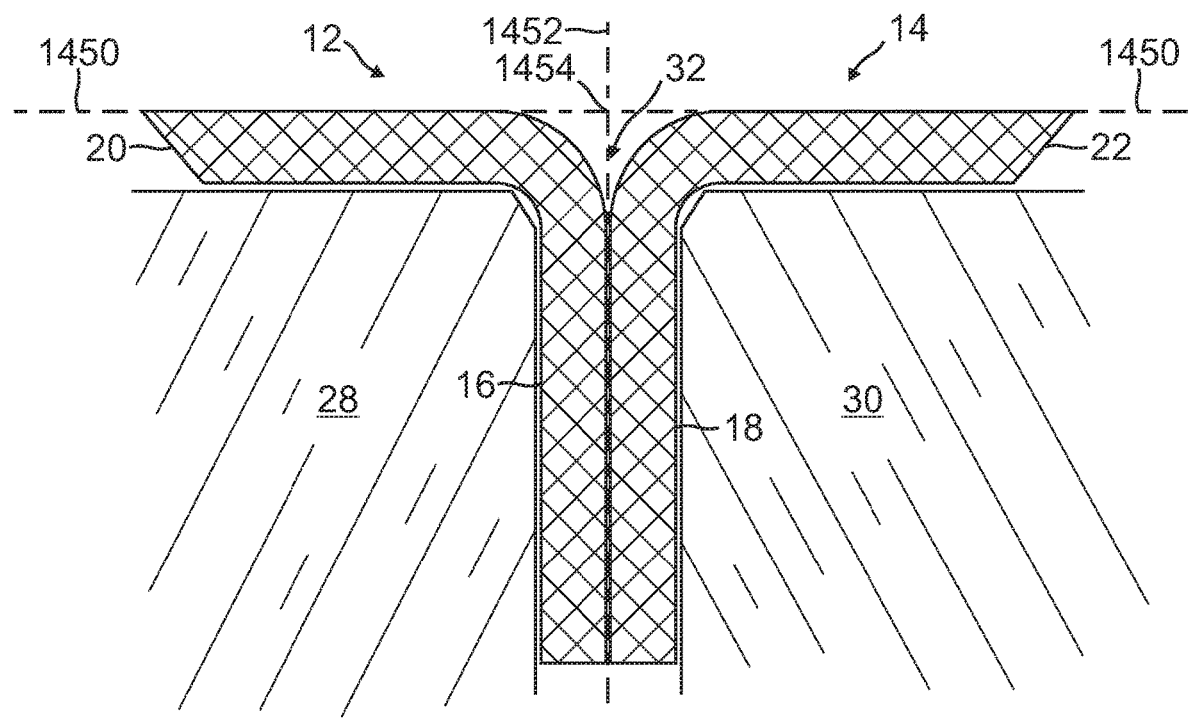
FIGS. 2A-2C are cross-sectional views of successive steps involved in the fabrication of the composite structure of FIGS. 1A and 1B.

FIG. 1A is a perspective end view of an example composite structure 10, viz., an aircraft stringer, to which the systems and methods of the present disclosure are mainly directed, and FIG. 1B is a cross-section view of the structure 10, as seen along the lines of the section 1B-1B taken in FIG. 1A. As can be seen in these figures, the structure 10 comprises a pair of elongated, L-shaped composite structural members 12 and 14, each having a respective vertical "leg" 16 or 18, which are disposed in a back-to-back abutment with each other so as to define a nascent composite structure having the generally T-shaped cross-section seen in FIG. 1B.

As a result of this arrangement, a longitudinally extending, generally V-shaped groove or channel 32 is defined between the upper, horizontal "flanges" 20 and 22 of the two members 12 and 14, and as discussed above, a correspondingly shaped fillet or bead 24 of a composite filler material 200 is disposed within the channel 32. Optionally, as illustrated in FIGS. 1A and 1B, a third composite structural member 26, e.g., a band of composite material 26, can be bonded onto the bead 24 of filler material 200 and the horizontal flanges 20 and 22 of the structural members 12 and 14 to further strengthen and stiffen the resulting structure 10.

Figure 2B:
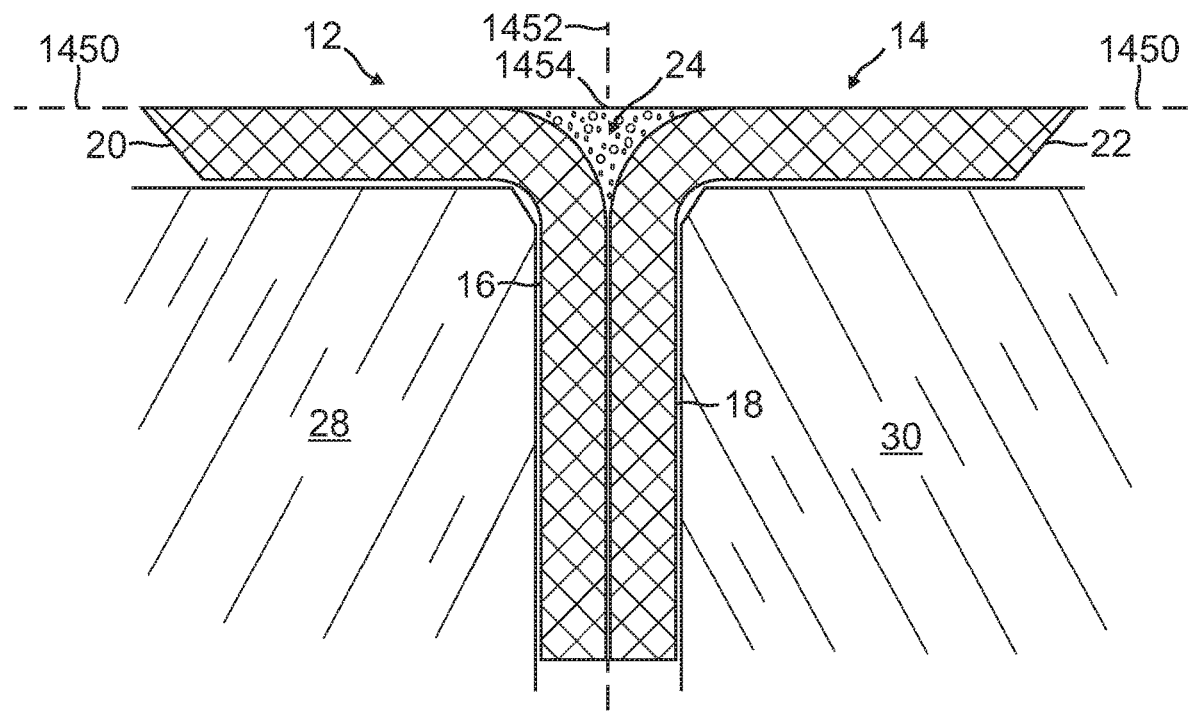
Figure 2C:
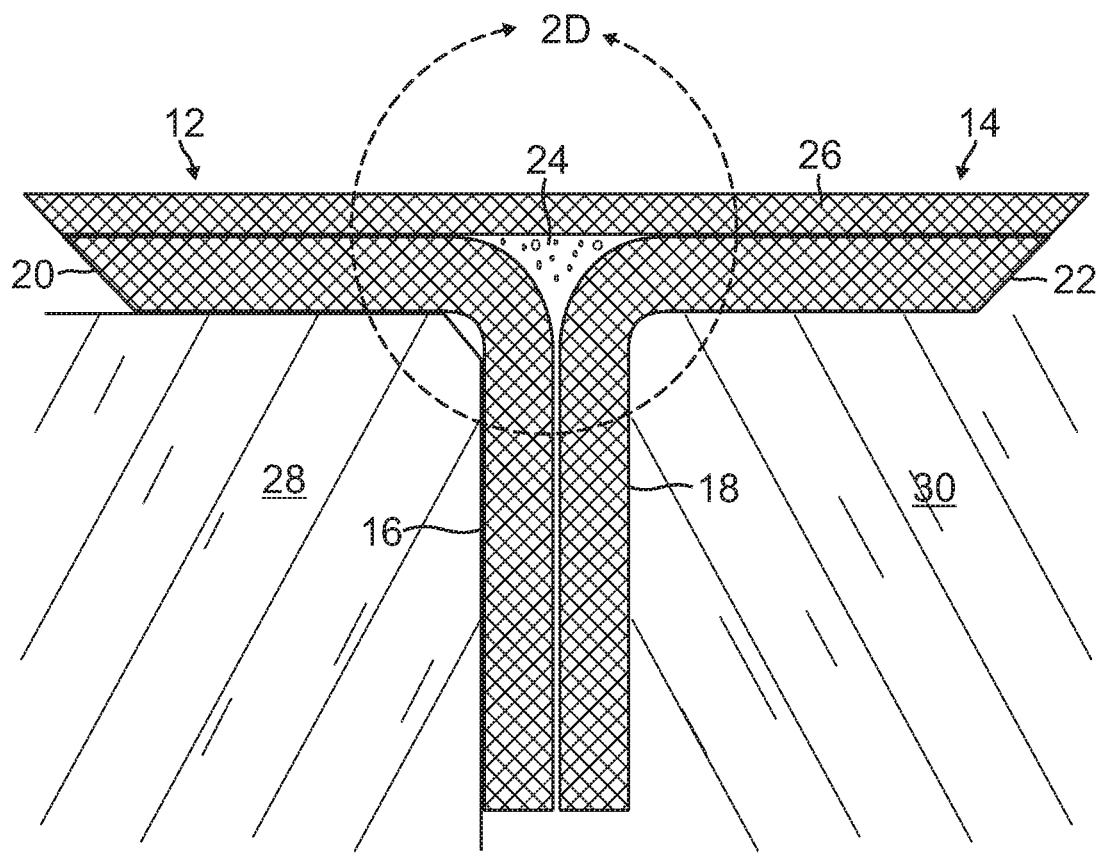
Figure 2D:
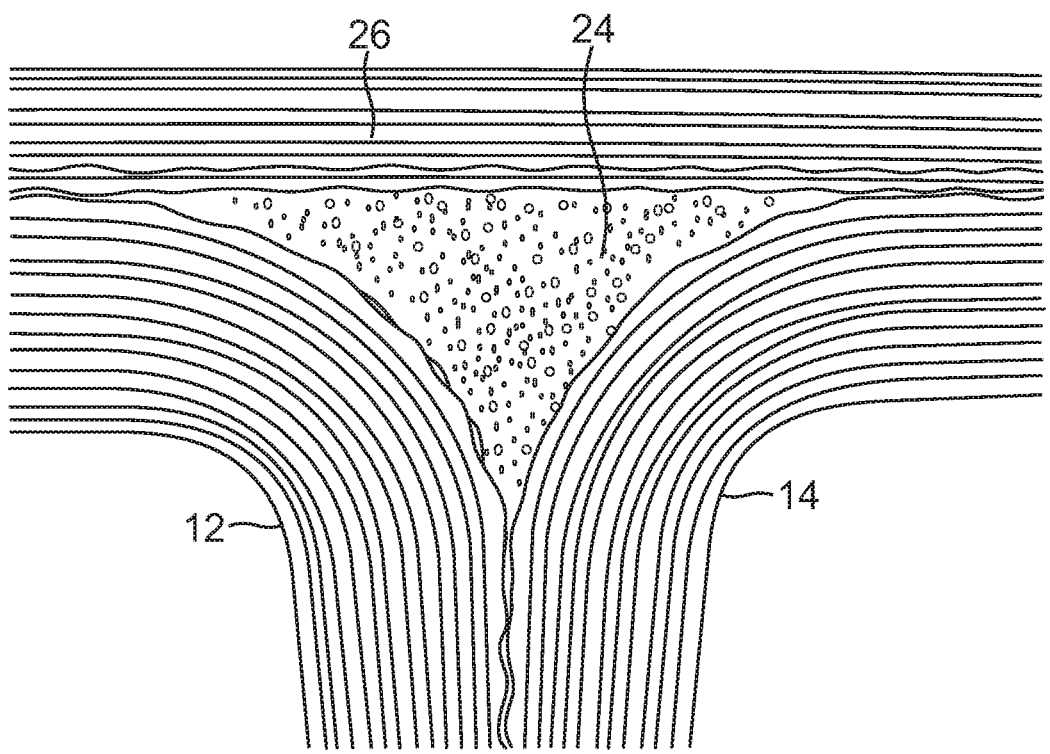
FIG. 2D is an enlarged photograph of a partial cross-sectional area of an actual composite structure corresponding to that indicated in FIG. 2C as detail 2D, showing a V-shaped channel disposed between two adjacent, L-shaped composite structural members and below a third structural member, with an example embodiment of a compacted bead of a composite filler material substantially filling the channel.

FIGS. 2A-2C are cross-sectional views of successive steps involved in a process for fabricating the composite structure 10 of FIGS. 1A and 1B, and FIG. 2D is an enlarged photograph of a cross-sectional area of an actual composite structure 10 corresponding to that illustrated in FIG. 2C and indicated therein as detail view 2D. As illustrated in FIG. 2A, in one practical embodiment, the process can begin with clamping the vertical "legs" 16 and 18 in a fixture, comprising a pair of opposing, spaced-apart plates 28 and 30, such that they are disposed in a back-to-back abutment with each other. Optionally, the two legs 16 and 18 can be bonded to each other. Their respective horizontal flanges 20 and 22 are then disposed parallel to each other atop the fixture, so as to define the generally V-shaped channel 32 discussed above.

The cross-sectional view of FIG. 2B illustrates the nascent T-shaped structure after the reinforcing bead 24 of composite material has been deposited in the channel 32 and compacted therein by, e.g., the use of a screed or a roller, and FIG. 2C shows a similar view, but after the third structural member 26 has been disposed atop the bead 24 of filler material and the horizontal flanges 20 and 22.

In one possible embodiment, the components of the assembly, i.e., the L-shaped structural members 12 and 14, the third structural member 26, and the bead 24 of the composite filler material, can be provided in a partially cured state, e.g., in a so-called "B-stage" condition, in which they are relatively flexible and "tacky," to facilitate the assembly process. That is, the materials can be applied and/or assembled in the partially cured state at one location and at an initial time, such that they are tacked together to help hold the laminated structure configuration until final curing, and then finally cured in another location, e.g., hours or even days later. Accordingly, for the structure 10 to reach its optimum strength and stiffness, the components of the assembly must be finally cured, which is typically effected at an elevated temperature and pressure, e.g., in an autoclave.

FIG. 2D is an enlarged photograph of a partial cross-sectional area of an actual composite structure corresponding to that indicated as detail view 2D in FIG. 2C, showing an example embodiment of the compacted bead 24 of a composite filler material substantially filling the V-shaped channel 32 between two composite structural members 12 and 14 and below the third structural member 26.

In one possible formulation, the noodle or channel filler material can comprise one in which first and second groups of reinforcing fibers, e.g., carbon, glass, aramid, basalt, or the like, are dispersed within a fluid, polymeric matrix material, e.g., a thermosetting epoxy resin. The fibers of the first group can have a first length and an aspect ratio of 2000 or less, and the fibers of the second group can have a second length that is substantially shorter than the first length. In addition to the fibers, the novel formulation can include thixotropic nanoparticles and/or "toughening" agents that are also dispersed within the resin. This formulation results in an isotropic, short fiber, reinforced thermosetting resin channel-filler.

Figure 2E:
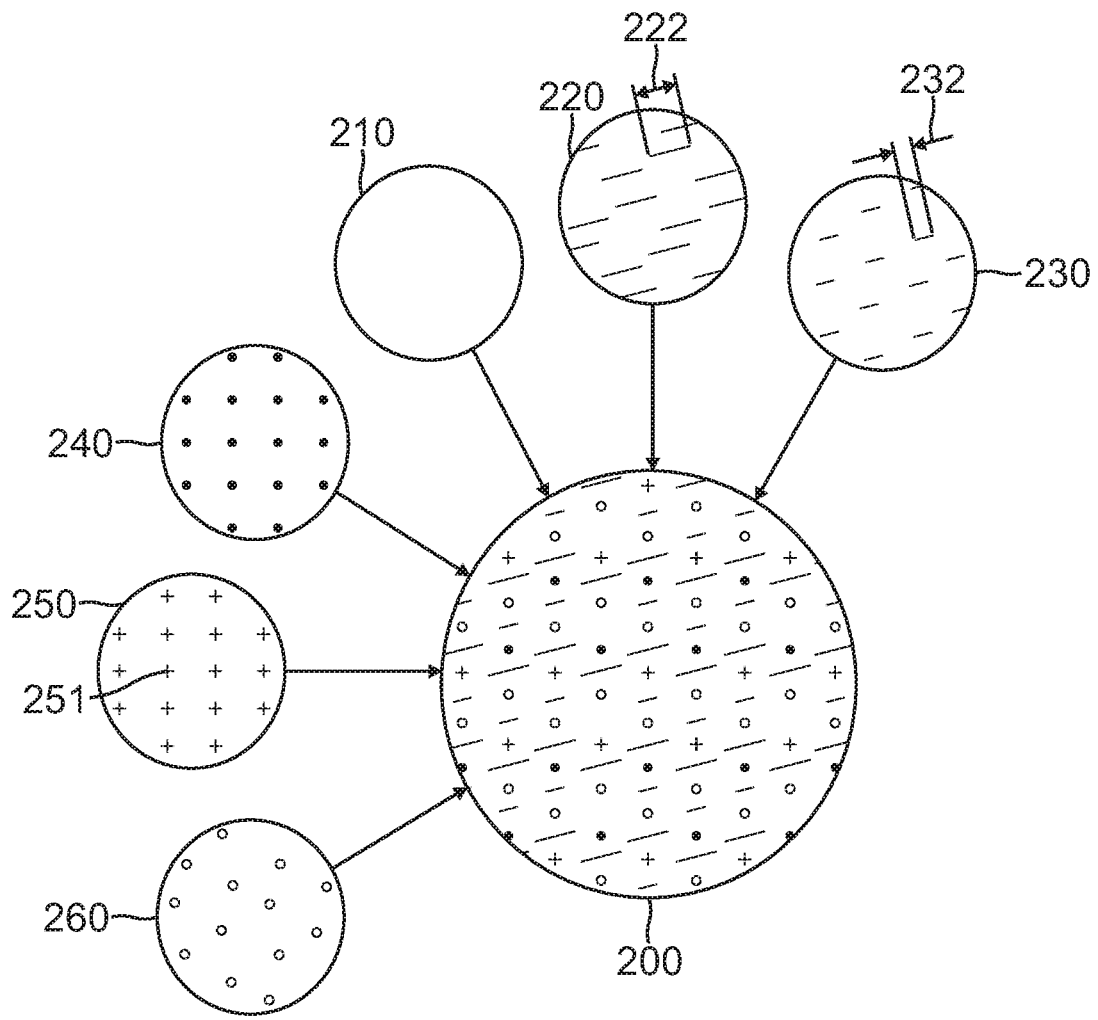
FIG. 2E is a schematic view of an example embodiment of a composite channel filler material, according to an embodiment of the present disclosure.
Figure 3:
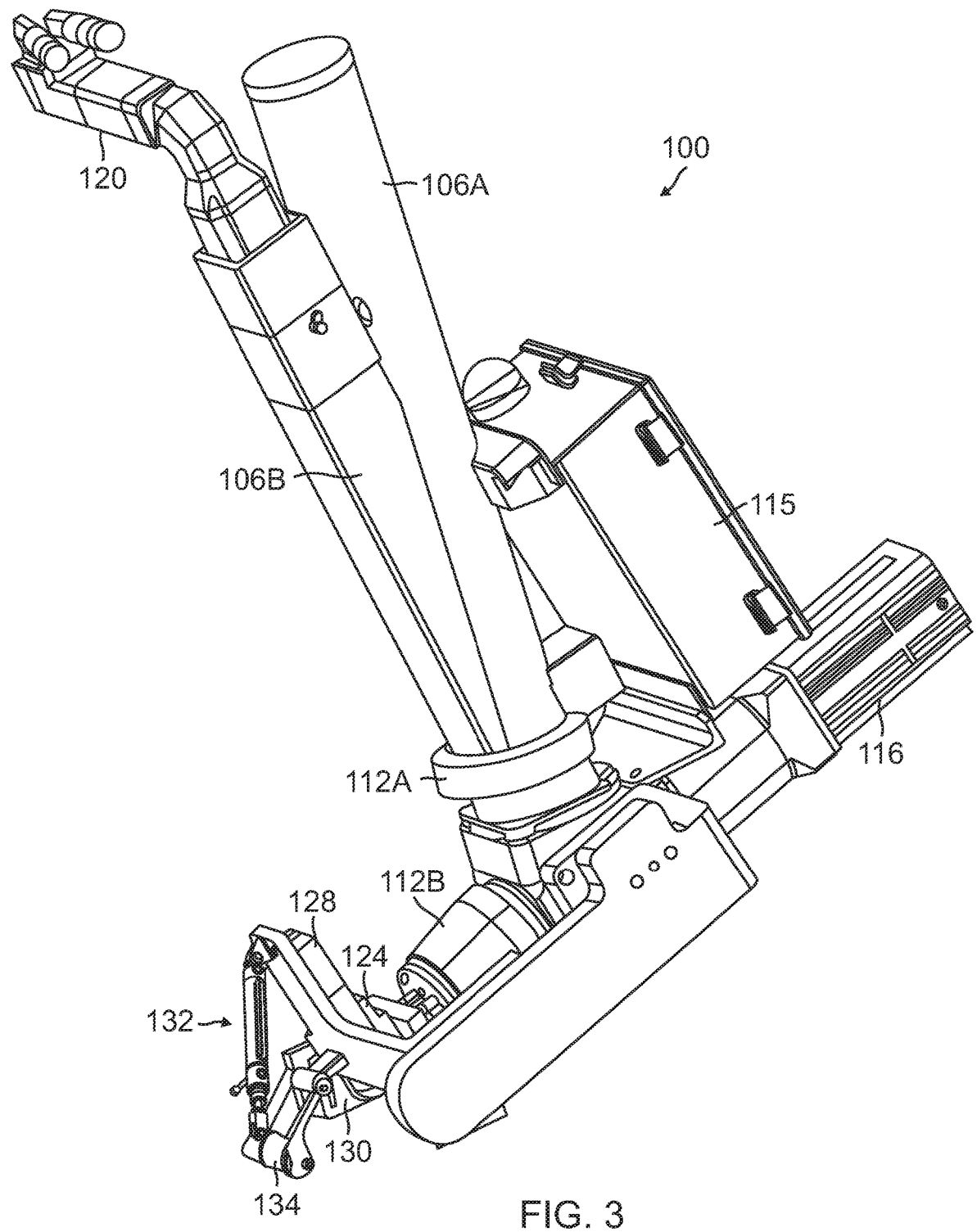
FIG. 3 is an upper, front, and left side perspective view of an example embodiment of an end-effector in accordance with the present disclosure.

FIG. 2E is a schematic view of a composite channel filler material 200 formulated in accordance with an example embodiment of the foregoing formulation. The composite channel filler material 200 of the illustrated embodiment is compounded for an "in-situ" application (i.e., formed as a paste or paste-like material that can be applied by various techniques to nascent structural member elements at the time of their assembly), for joining plural adjacent composite structural members along a common seam or length of the members. The composite channel filler material 200 depicted includes a resin matrix 210, e.g., a thermosetting resin 210, a first group of fibers 220 dispersed within the resin 210, a second group of fibers 230 dispersed within the resin 210, a third group of fibers 240 dispersed within the resin 210, a group 200 of thixotropic particles 251 dispersed within the resin 210, and a toughening agent 260 dispersed within the resin 210. The fibers of the first group 220 can have a length 222 that is substantially longer the length 232 of the fibers of the second group 230. The composite channel filler material 200 can be used, for example, to provide the composite channel filler 24 of the type discussed above in connection with FIGS. 1A-2D.

Generally speaking, one or more of the various additives (i.e., the first group of fibers 220, second group of fibers 230, third group of fibers 240, thixotropic particles 251, toughening agent 260) are added to the resin 210 to improve one or more properties of the resulting composite channel filler material 200. For example, one or more of the additives can be utilized to lower the coefficient of thermal expansion (CTE) of the composite channel filler material 200. In another example, one or more of the additives can be utilized to improve the elastic modulus of the composite channel filler material 200. In yet another example, one or more of the additives can be utilized to improve the tensile strength of the composite channel filler material 200. In still yet another example, one or more of the additives can be utilized to maintain a proper flow viscosity for the manufacturability of a structure in conjunction with which the composite channel filler 200 is to be used.

In one practical embodiment, the filler material 200 can be produced by mechanically mixing appropriate amounts of the first and second groups of fibers 220 and 230, and optionally, the nanoparticles 251 and toughening agents, in the liquid resin matrix to produce a mixture that can then be "staged," i.e., partially cured, e.g., by heating, to the desired viscosity, as discussed above, for application to the channel 32 between the structural members 12 and 14, as described above in connection with, e.g., FIG. 2B. As discussed in more detail below, it is desirable that the filler material 200 be thick enough to prevent it from running when it is deposited into the channel 32, and thin enough to enable it to be fully compacted into the channel 32 such that its upper surface is generally flush, or coplanar with, the upper surfaces of the respective horizontal flanges 20 and 22 of the structural members 12 and 14 after it is compacted.

The conventional fabrication procedure can involve the application of the channel filler material 200 by hand, which can lead to less than desirable results.

In accordance with the present disclosure, the conventional fabrication process can be replaced by a system that includes an "end-effector," operating in conjunction with a robot mounted on a carriage that travels adjacent to a composite structure, such as an aircraft stringer, which has an elongated channel that is to be filled with a composite filler material. Other movement systems instead of the carriage and robot and application systems other than an end-effector on a robot are also envisioned for use in this type of system. The system deposits into the channel a void-free bead 24 of the filler material 200 in which longer reinforcing fibers are oriented longitudinally (e.g., generally parallel to the long direction of the channel), shorter fibers are oriented randomly, and the bead 24 has a cross-sectional profile that can be varied instantaneously to precisely match that of a channel which has a cross-sectional profile that varies with its length.

FIGS. 3-12D are various views of an example embodiment of such an end-effector 100 in accordance with the present disclosure. As illustrated in, e.g., FIGS. 10 and 11, the example end-effector 100 comprises an elongated cylindrical barrel 102 having a helical extrusion screw 104 rotatably disposed therein. A hopper 106A or 106B (see FIGS. 3-10) has a lower end disposed in fluid communication, via an aft aperture 107 of the barrel 102, and is configured to hold a composite filler material 200, e.g., of the type discussed above, in an uncured or partially cured state, i.e., having a thick liquid or paste-like consistency, and to feed it into the barrel 102 at a controlled rate.

Figure 12A:
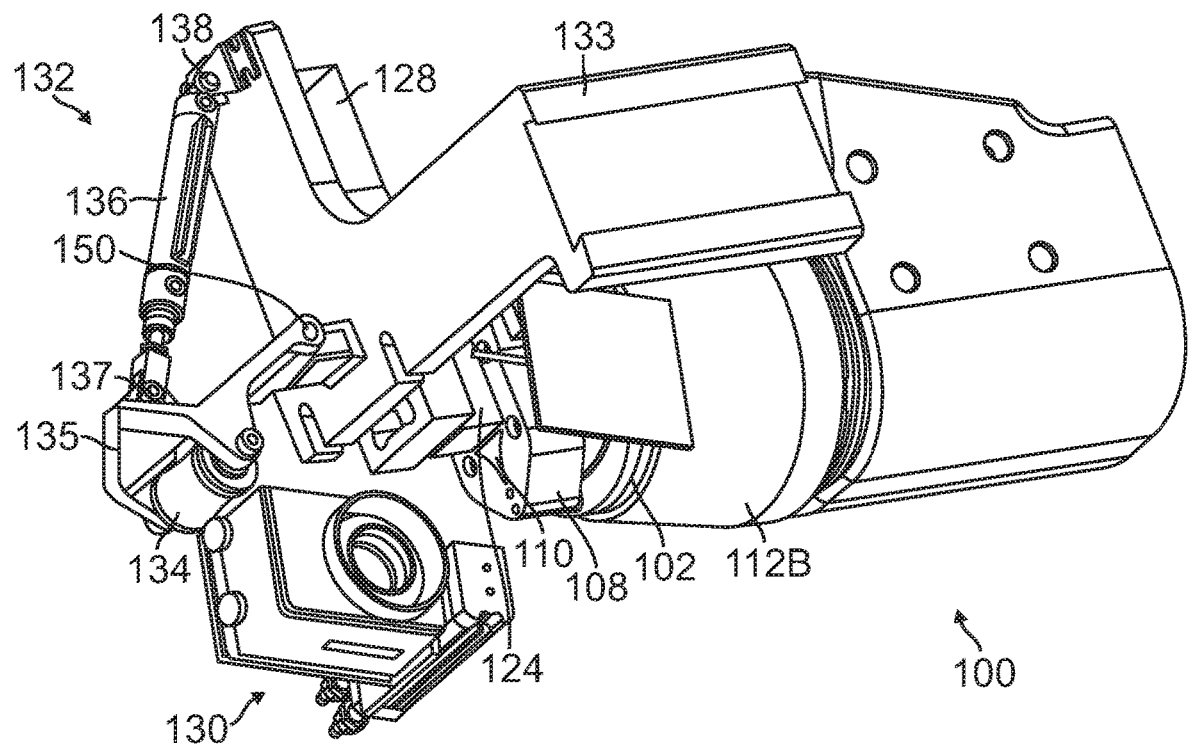
FIG. 12A is a partial front and left side perspective view of the end-effector, showing a housing, extrusion die, aperture gating assembly, support bracket, machine vision system and roller assembly thereof.
Figure 12B:
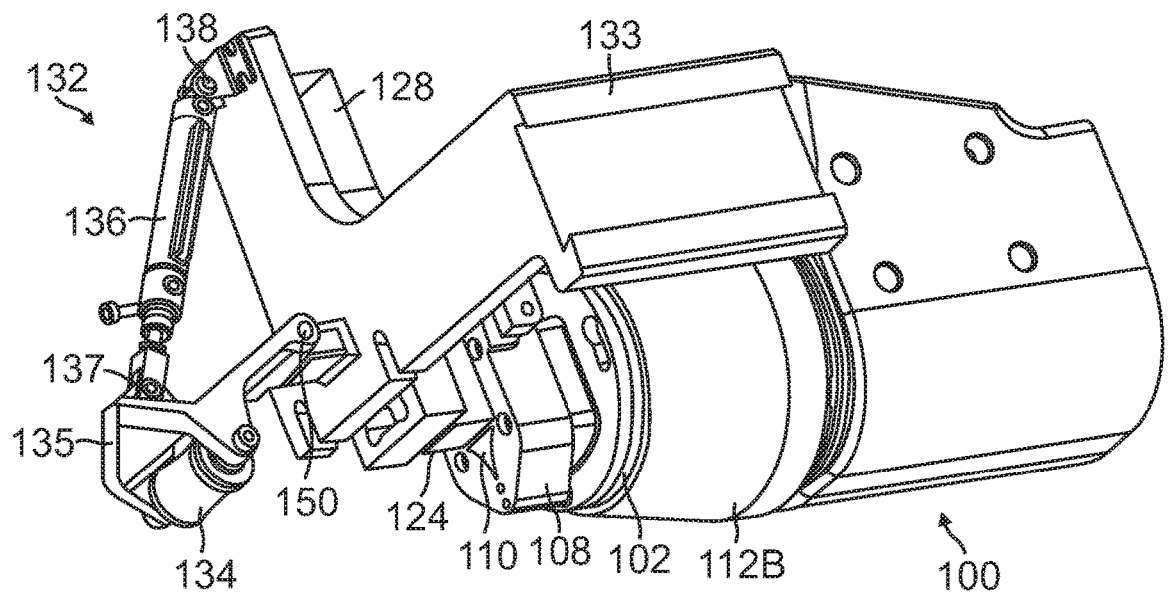
FIG. 12B is a partial perspective view of the end-effector similar to FIG. 12A, in which the machine vision system has been omitted for purposes of visualization.
Figure 12C:
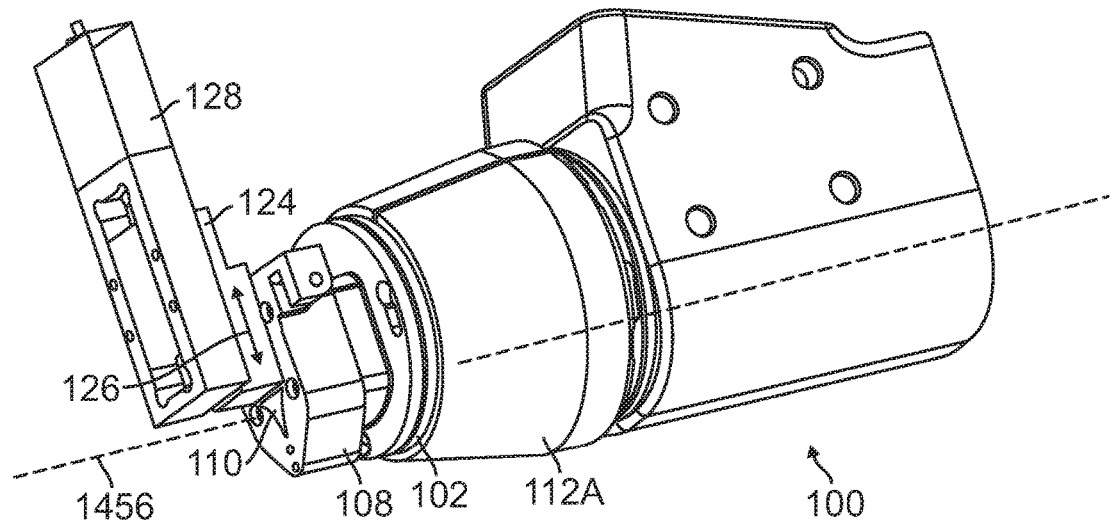
FIG. 12C is a partial perspective view of the end-effector similar to FIG. 12B, in which the roller assembly, and support bracket have been omitted for purposes of visualization.
Figure 12D:
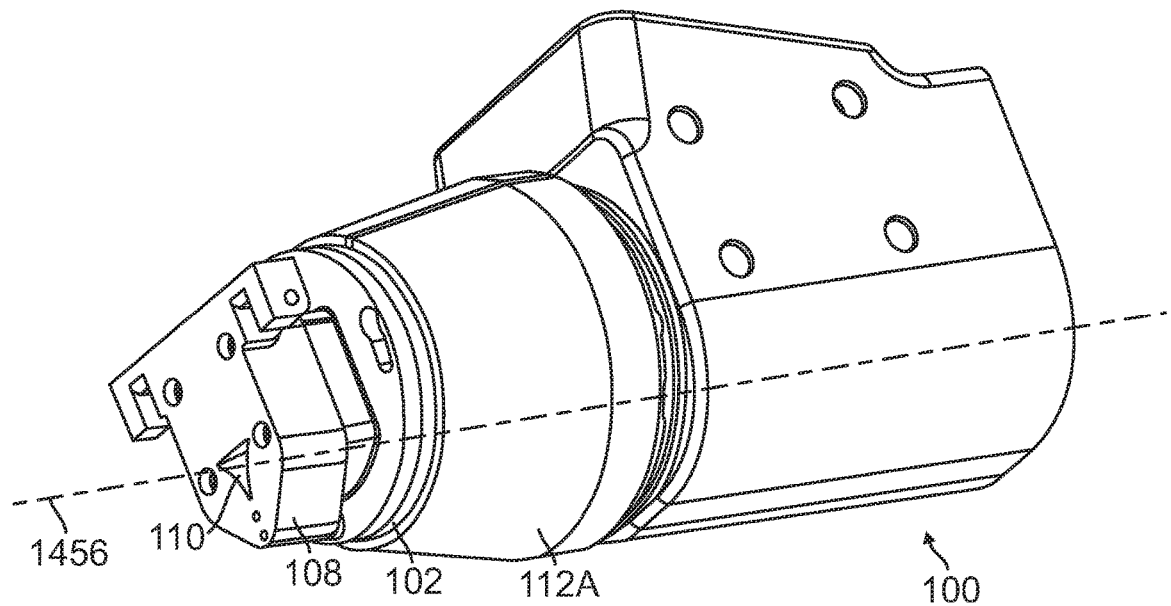
FIG. 12D is a partial perspective view of the end-effector similar to FIG. 12C, in which the gating assembly has been omitted for purposes of visualization.

As illustrated in, e.g., FIGS. 12C and 12D, a die 108 containing an extrusion aperture 110 is disposed in a sealed engagement with a front end of the barrel 102. In the particular example embodiment illustrated in FIGS. 12C and 12D, the aperture 110 has a generally ∇-shaped cross-section, so as to produce a bead 24 of a filler material 200 corresponding to a V-shaped channel, such as that described above in connection with FIG. 2A, that is to be filled with the filler material 200. However, as those of some skill will understand, the extrusion aperture 110 can have any of a number of other cross-sectional profiles, depending on the cross-sectional profile of the channel to be filled, such that the cross-sectional profile of the bead produced by the aperture 110 during operation will closely match that of the channel that is to be filled with the bead. It is also possible to have an aperture that could have a variable and/or controllable cross-section and possibly a gate to shut off the flow.

As those of some skill will also appreciate, the combination of a helical screw rotatably disposed within a cylindrical barrel defines an ancient pumping device sometimes referred to as an "Archimedes' screw." It is believed that this type of pumping device is preferred over other types in this particular application for the following reasons.

As discussed above in connection with FIG. 2E, in one advantageous embodiment, the filler material 200 can comprise a matrix of a thermoplastic or a thermosetting resin containing a first group of fibers having a first length, and a second group of fibers having a second length that is substantially shorter than the first length. Moreover, for the structural reasons discussed above, it is desirable that the longer fibers be aligned substantially longitudinally within the bead 24 of extruded filler material 200, whereas, the second group of fibers be aligned in substantially random directions therein. It has been discovered that this desirable orientation of the reinforcing fibers can be obtained inherently by the close rotation of the crest of the thread of the screw 104 relative to the interior wall surface of the barrel 102, which achieves a longitudinal "wiping" or "combing" effect with regard to the longer fibers, whereas, the shorter fibers tend to remain relatively unaffected thereby, and instead, to be mixed in random directions by the rotation of the screw 104.

Additionally, the rotation of the screw 104 within the barrel 102 tends to push air bubbles and voids entrained within the filler material 200 rearwardly within the barrel 102, while pushing the fluid filler material 200 forwardly in the barrel 102, thereby serving to separate the voids and air bubbles from the filler material 200 as it is pushed toward the front end of the barrel 102. This process helps with degassing the mixture, and a vacuum system of the type discussed below can also help with gas removal. This is in contrast to the operation of, e.g., a positive displacement pump, e.g., a piston pump, which isolates the liquid or solid filler material 200, together with any entrained bubbles or voids, ahead of the front face of the piston as it pushes the mixture forward in a "cylinder," e.g., the barrel 102.

In the embodiment illustrated in the figures, the example end-effector 100 is shown as having two hoppers, i.e., 106A, a simple elongated tube for containing the filler material 200 and feeding it into the barrel 102 by the force of gravity, and 106B, a "powered" hopper, discussed in more detail below, that contains a motor-driven screw 118, and which can operate, in the case of more viscous filler materials 200, in conjunction with a vacuum and a screw 118 to "force-feed" the barrel 102 with the filler material 200. However, it should be understood that only one of the alternative hopper configurations 106A or 106B is used at a time with the end-effector 100 during its operation, depending on the particular application at hand.

Figure 11:
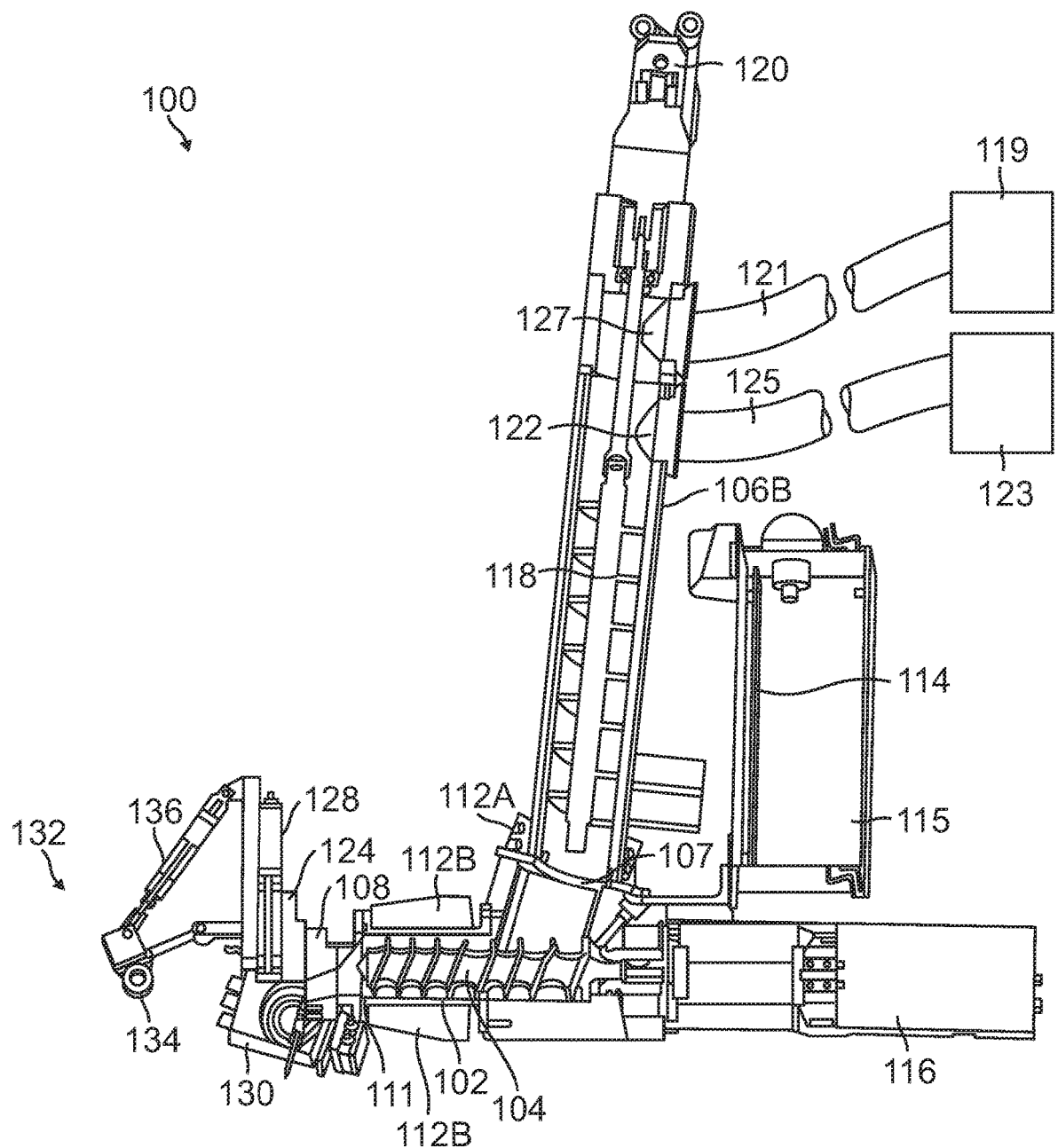
FIG. 11 is a left side inboard profile of the end-effector.

As illustrated in, e.g., FIG. 11 and discussed below in connection with the feedback loop and control system 1500 of FIG. 15, the example end effector 100 can include a pair of heaters 112A and 112B. The heaters 112A and 112B can be configured with a suitable controller 1502, in the form of a pair of closed loop control circuits 1504 and 1506 (see FIG. 15) disposed on a common controller printed circuit board (PCB) 114, that can be located within a common controller housing 115, to controllably heat the filler material 200 (e.g., shown in FIG. 2E) when disposed in the hopper 106A or 106B and the barrel 102, e.g., in two steps or stages. In the particular example embodiment illustrated, the first heater 112A comprises a heat jacket that surrounds the lower end of the hopper 106A or 106B, so as to heat the filler material 200 when it is disposed in the hopper 106A or 106B, and the second heater 112B comprises a clam-shell-like heater jacket that surrounds the barrel 102, so as to heat the filler material 200 when it is disposed therein.

Figure 10:
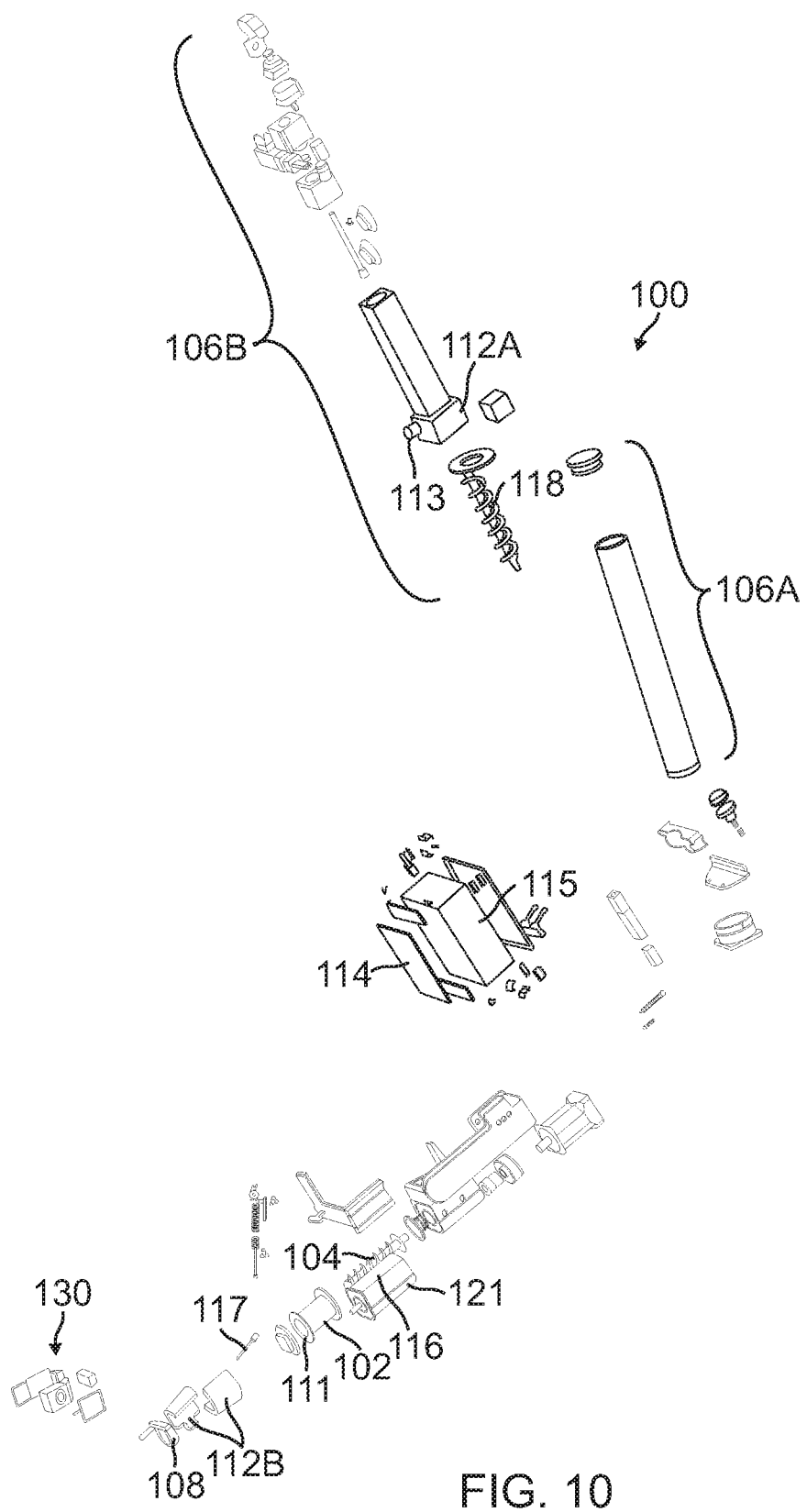
FIG. 10 is an exploded left side perspective view of the end-effector.

As illustrated in, e.g., FIG. 10, in one advantageous embodiment, the first heater 112A can have a first temperature sensor 113 associated with it that is configured to detect the temperature of the filler material 200 when disposed in the hopper 106A or 106B, and the second heater 112B can have a second temperature sensor 117 associated with it that is configured to detect the temperature of the filler material 200 when it is disposed in the barrel 102. An associated temperature controller 1502, e.g., one located on the common controller printed circuit board (PCB) 114, can be disposed in communication with the first and second temperature sensors 113 and 117 via the feedback loops 1504 and 1506 and configured to selectively operate the first and second heaters 112A and 112B in response to the first and second temperatures. For example, in one embodiment, the first heater 112A can be configured to heat the filler material 200 disposed in the hopper 106A or 106B to approximately 140 degrees Fahrenheit, and the second heater 112B can configured to further heat the filler material 200 (e.g., shown in FIG. 2E) when disposed in the barrel 104 to approximately 190 degrees Fahrenheit.

Figure 4:
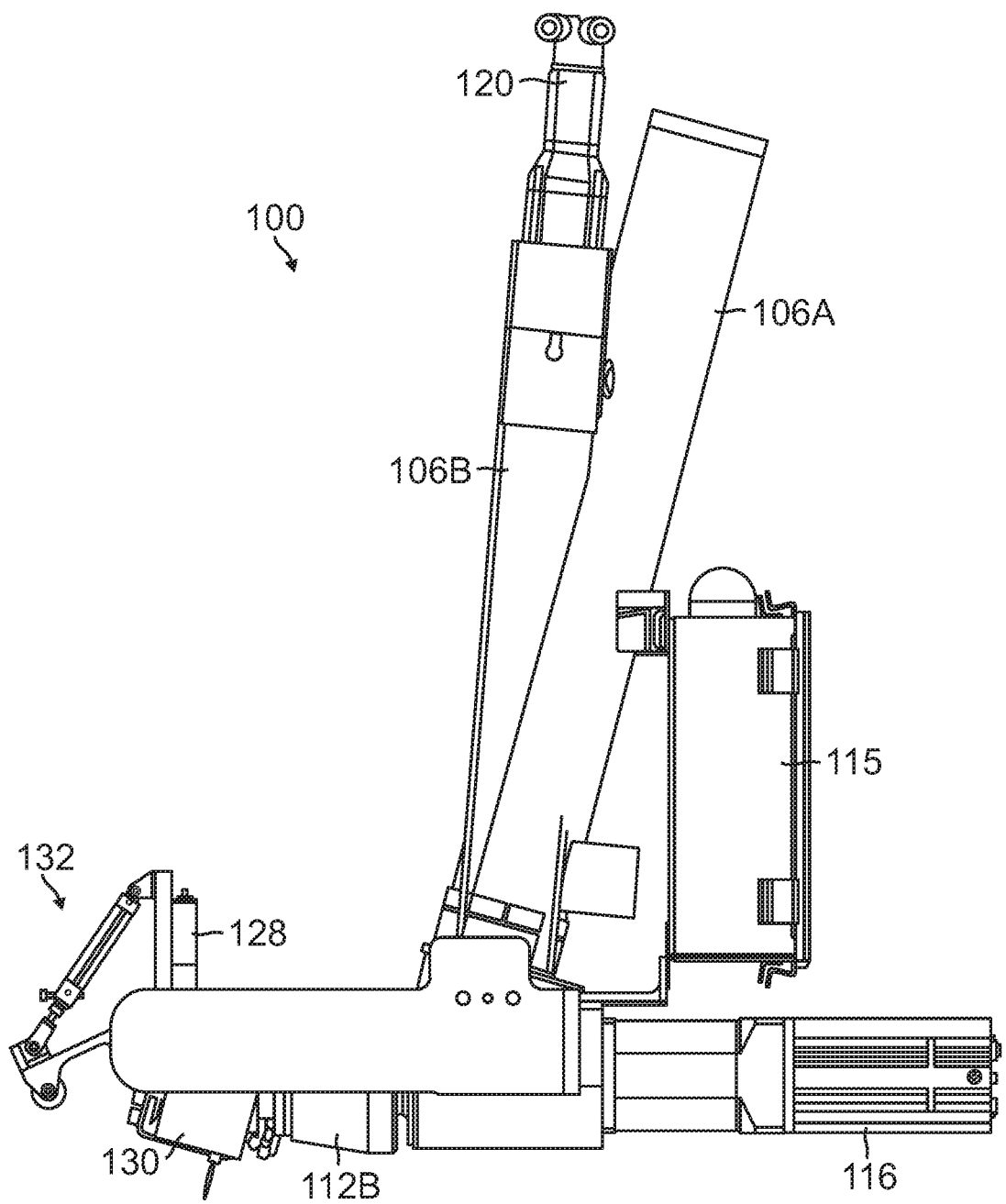
FIG. 4 is a left side elevation view of the end-effector.
Figure 5:
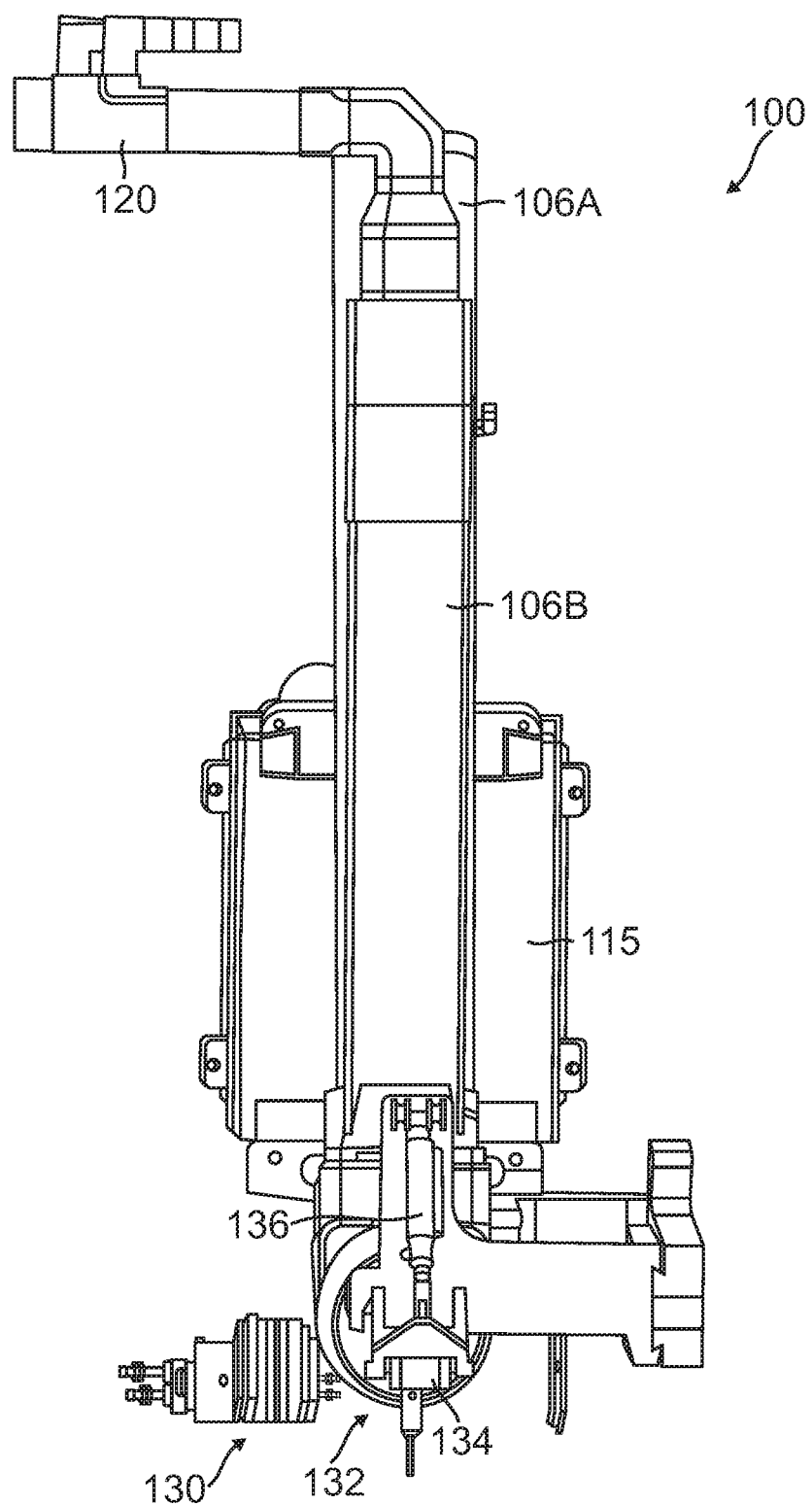
FIG. 5 is a front end elevation view of the end-effector.
Figure 6:
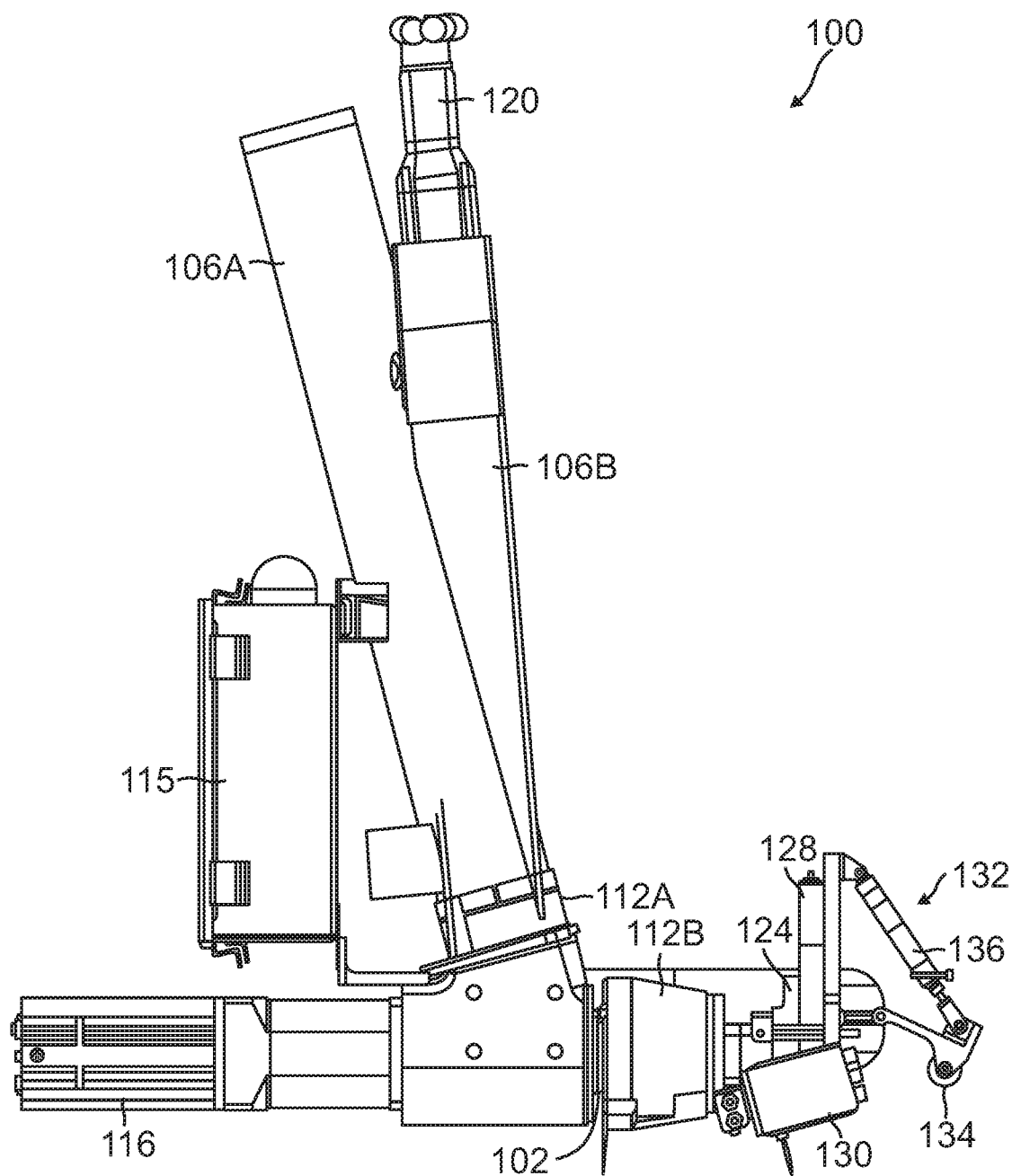
FIG. 6 is a right side elevation view of the end-effector.
Figure 7:
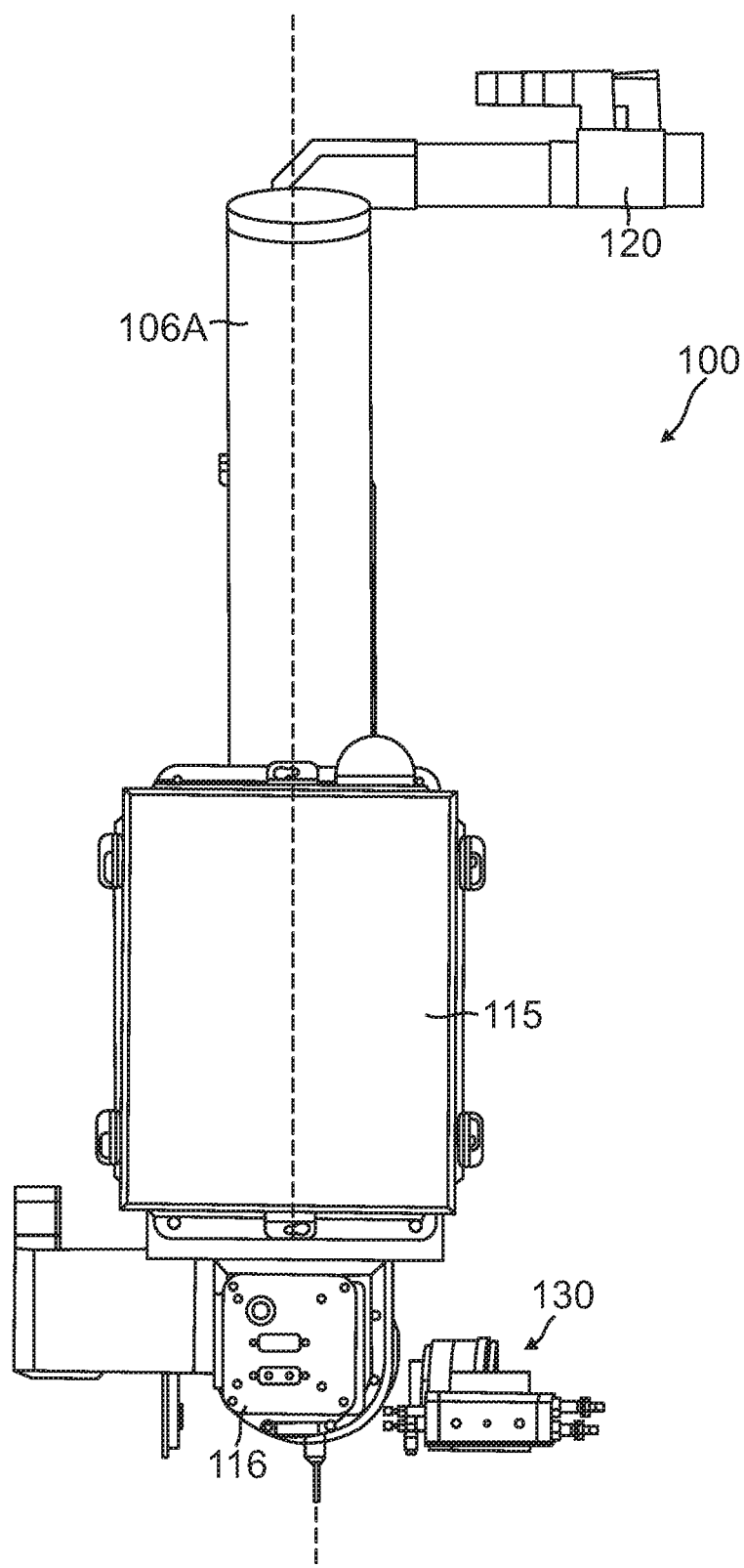
FIG. 7 is a rear end elevation view of the end-effector.
Figure 8:
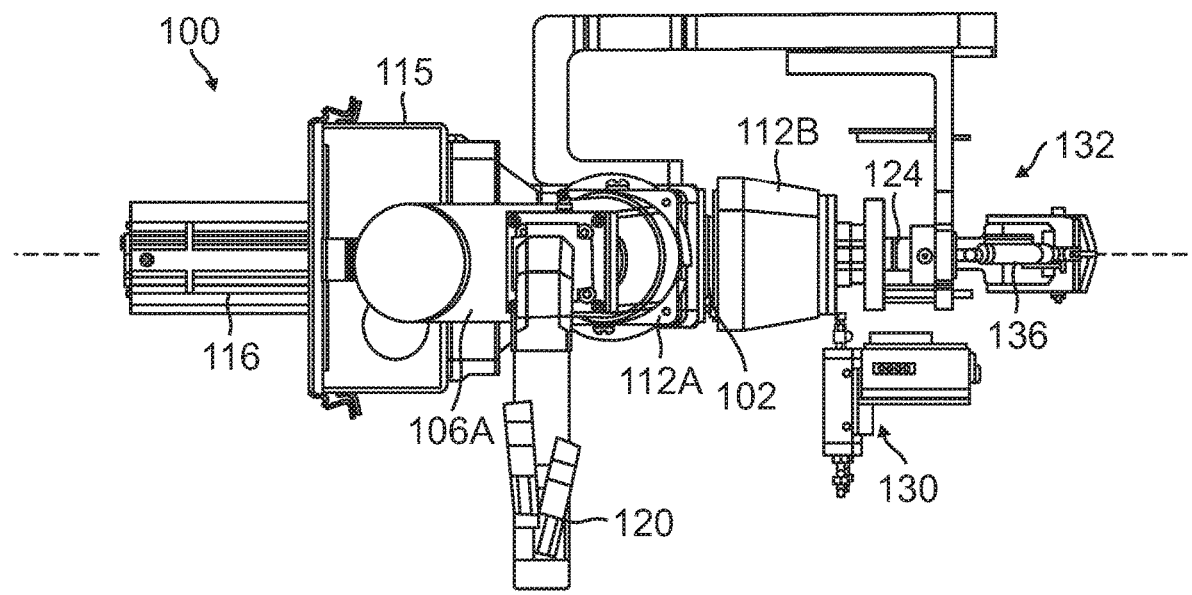
FIG. 8 is a top plan view of the end-effector.
Figure 9:
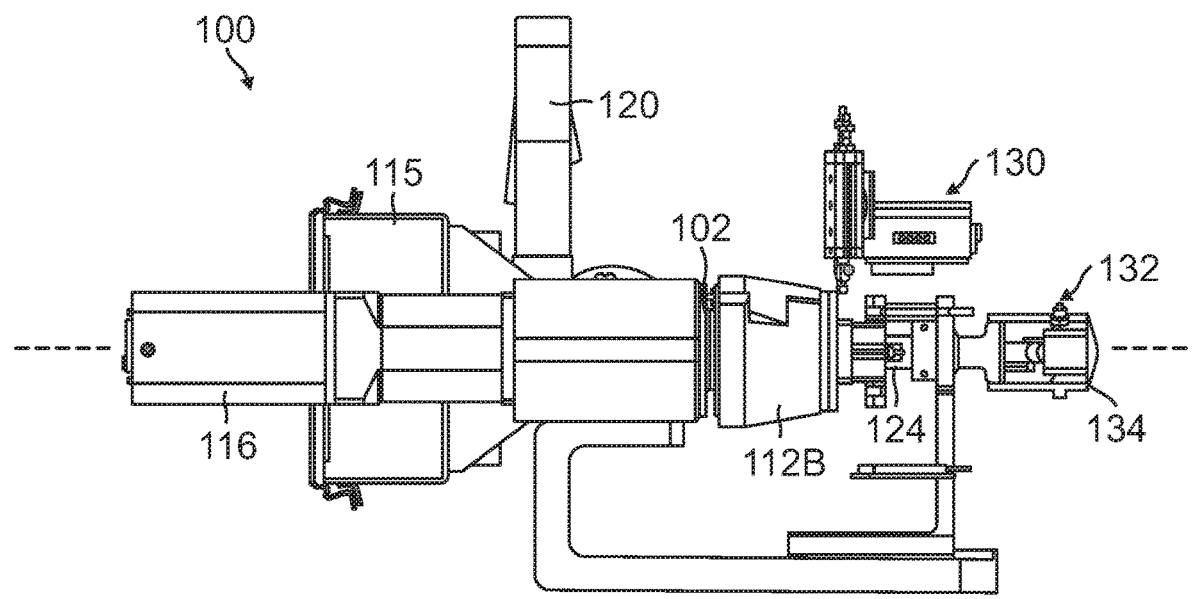
FIG. 9 is a bottom plan view of the end-effector.
Figure 14:
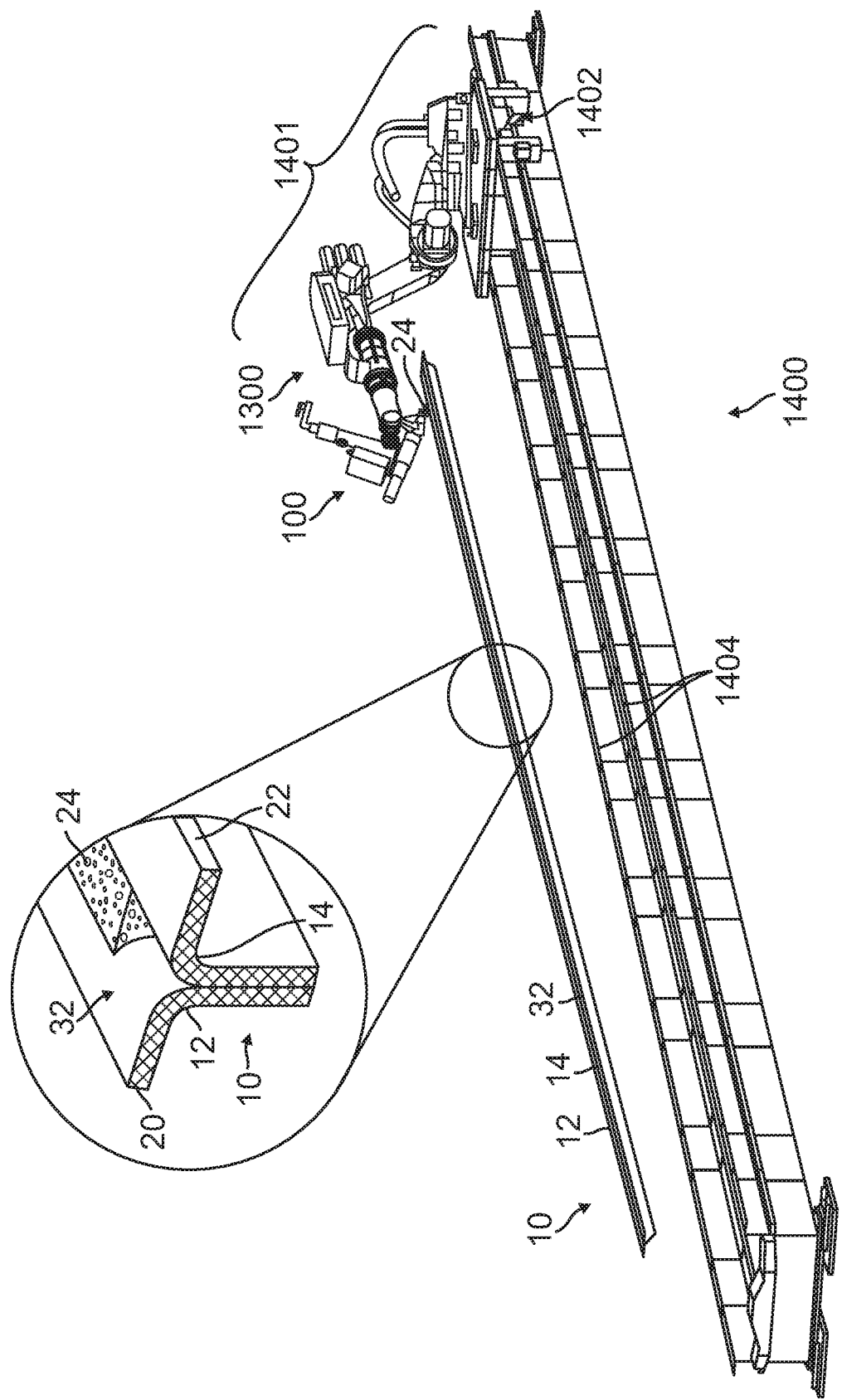
FIG. 14 is a perspective view of a drive system comprising a carriage configured to move longitudinally along rails disposed adjacent to a channel, showing the robot and end-effector of FIG. 13 disposed thereon.

As illustrated in, e.g., FIGS. 4 and 5, the end-effector 100 includes a motor 116, e.g., an electric motor, disposed at a rear end of the barrel 102 and configured to rotate the screw 104 to pump or compress the filler material 200 forwardly therein so as to express or extrude a bead 24 of the filler material 200, such as illustrated in FIGS. 2B and 14, through the aperture 110 at a controllable temperature and rate. In one advantageous embodiment, the motor 116 can include an integral speed sensor 121, e.g., an encoder, configured to detect the rotational speed of the motor 116, and an associated controller 1502, e.g., one disposed on the common controller PCB 114, can be disposed in communication with the speed sensor 121 and a flow sensor 111 (see FIG. 11) located, e.g., in the barrel 102, through a feedback loop 1508. The associated controller 1502 can be configured to adjust the speed of the motor 116 in response to the speed sensor 121 and the flow sensor 111 so as to precisely control the rate of rotation of the screw 104, and hence, the rate of extrusion of the bead 24 of filler material 200 illustrated in FIGS. 2B and 14 when extruded from the aperture 110 illustrated in FIGS. 12A-12D.

As discussed above, in some embodiments, it might be desirable to provide a mechanism, i.e., other than gravity, for feeding the filler material 200 into the barrel 104 of the end-effector 100. As illustrated in, e.g., FIGS. 10 and 11, this can be effected by the provision of a "powered" hopper 106B, which incorporates a second helical screw 118 disposed in the hopper 106B and configured to agitate the filler material 200 and pump it into the barrel 102. As illustrated in, e.g., FIG. 11, in one possible embodiment, the feeder hopper 106B can be provided with a pair of ports, viz., a vacuum attachment port 127 and a filler material 200 inlet port 122.

In this embodiment, a source of a vacuum 119 can be coupled, e.g., via a first hose 121, to the vacuum port 127 of the hopper 106B, and a source 123 of the filler material 200 can be coupled, e.g., via a second hose 125, to the filler inlet port 122 thereof. A vacuum can then be applied to the first port 127, both to evacuate gases being de-gassed from the composite as it is being compressed and heated, and voids and air bubbles from the filler material 200, and to draw it into the hopper 106B through the second port 122, where it is collected by the thread of the second screw 118 and thereby pumped down into the barrel 102 of the end-effector 100. For this purpose, a second motor 120 is provided at the upper end of the powered hopper 106B and coupled, e.g., through a right-angled drive, to rotate the second screw 118 at a programmably controllable rate.

As discussed above, in the particular embodiment illustrated in the figures, the aperture 110 has a cross-section configured to produce a bead 24 of filler material 200 corresponding in size and shape to a channel 32, such as that described above in connection with, e.g., FIGS. 2A and 2B, that is to be filled with the filler material 200. However, it is possible that, in some embodiments, the channel 32 could have a cross-sectional profile that varies as a function of its length, in which case, it becomes desirable to provide a mechanism for varying the cross-sectional profile of the bead 24 instantaneously so as to precisely match that of the channel 32 into which the bead 24 is being deposited. As illustrated in, e.g., FIGS. 12C and 12D, in one possible embodiment, this can be effected by the provision of a "gate" 124 that is configured to selectively occlude the aperture 110 and thereby controllably adjust the cross-sectional profile of the bead 24 of filler material 200 as it is being deposited into the channel 32.

In the example embodiment illustrated, the gate 124 is selectably slid across the front face of the die 108 in the direction of the double-headed arrow 126 shown in FIG. 12C, such that it occludes all or a desired portion of the aperture 110. In one advantageous embodiment, this can be effected by an actuator 128, e.g., an electric or a pneumatic actuator 128, associated with the gate 124. As illustrated in, e.g., FIGS. 10-12A, in one advantageous embodiment, the gate actuator 128 can be controlled by a machine vision system 130 of the end-effector 100 through a feedback loop 1510 (see FIG. 15) that is configured to compare the applied profile of the bead 24 with a desired profile, and the controller circuit 1502 disposed, e.g., on the common controller PCB 112, that is configured to selectively operate the actuator 128 so as to move the gate 124 and thereby conform the applied profile of the bead 24 with the desired profile.

Figure 12E:
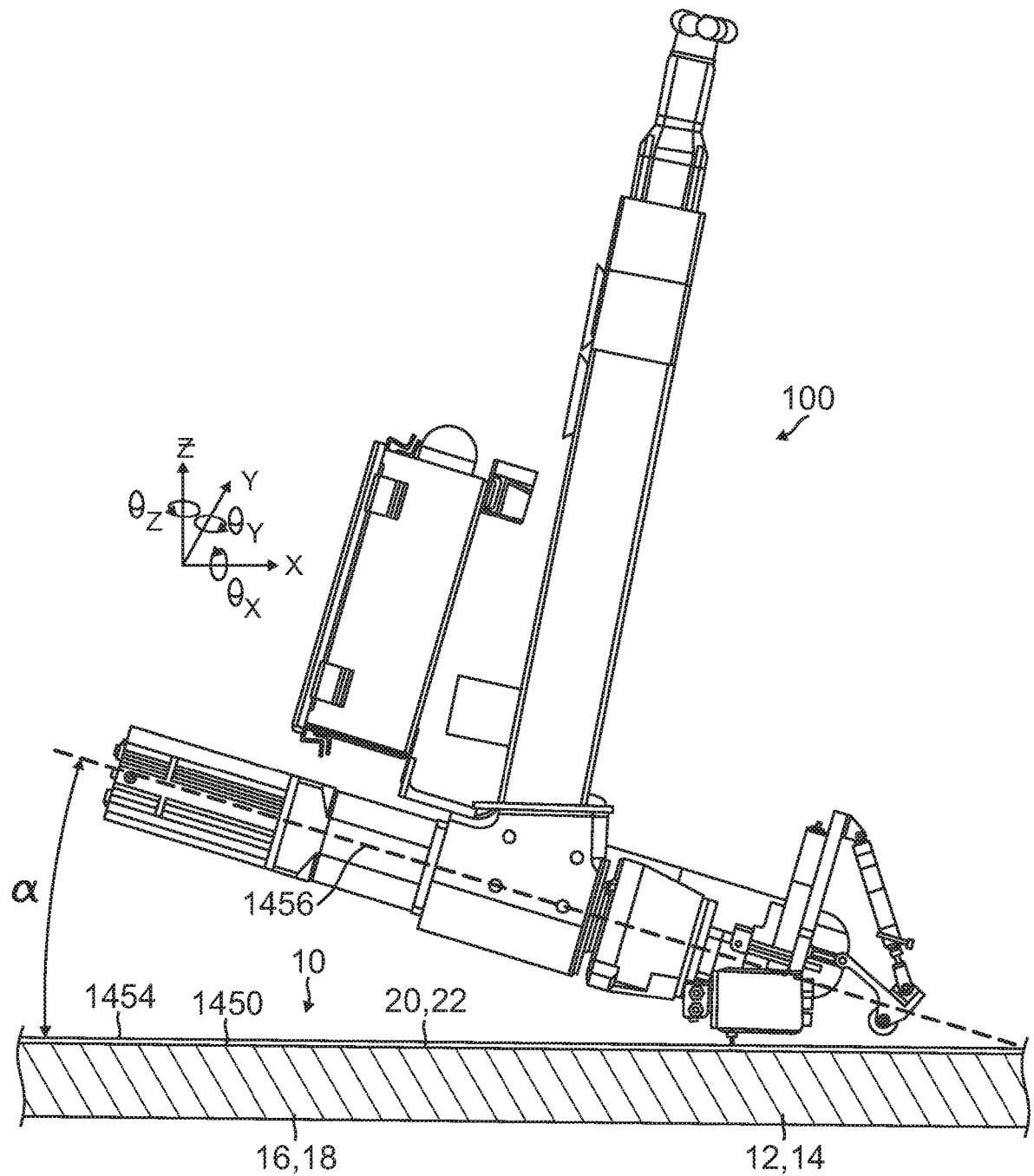
FIG. 12E is a left side elevation view of the example end-effector, shown disposed above composite structural elements of the type illustrated in FIGS. 1A-2D.

As discussed in more detail below, the machine vision system 130 can also be used to align the aperture 110 of the end-effector 100 with a channel 32 that is to be filled with the filler material 200, and to maintain or vary that alignment as the end-effector 100 is moved along the channel 32, while the bead 24 of filler material 200 is being deposited into the channel 32 by gravity. FIG. 12E is a left side elevation view of the example end-effector 100, shown disposed above a pair of abutting, L-shaped structural elements 12 and 14 of the type discussed above in connection with FIGS. 1A-2D. As discussed above in connection with FIGS. 2A and 2B, when the vertical legs 16 and 18 of the two structures 12 and 14 are clamped together between plates 30, 38 of a fixture (omitted in FIG. 12E for purposes of illustration), the upper surfaces of the horizontal flanges 20, 22 of the two structural elements 12 and 14 are disposed substantially coplanar with each other, and thus, define a common plane 1450, which, in some embodiments, can be oriented generally horizontally. Additionally, as illustrated in FIGS. 2A and 2B, in the particular example embodiment illustrated, the inner surfaces of the two vertical legs 16 and 18 of the two structural elements 12 and 14 are disposed substantially coplanar with each other and define a second plane 1452 shown in FIGS. 2A, 2B, and 12G that is generally orthogonal, or perpendicular, to the first plane 1450. As illustrated in FIGS. 2A, 2B and 12E, the intersection of the two planes 1450 and 1452 define a line 1454 that is disposed at the top of and centered with respect to the channel 32. FIG. 12G is a perspective view illustrating the structural members 12 and 14, the planes 1450 and 1452, and the line 1454.

As illustrated in FIGS. 12C and 12D, a line 1456 can be constructed that passes through the centroid of the aperture 110 and is disposed parallel to its inner sidewalls. In some possible embodiments, one or more of the barrel 102, the screw 104 and the motor 116 can be disposed coaxially with this line 1456, although this need not necessarily be the case. As illustrated in FIG. 12E, in some embodiments, the end-effector 100 can be oriented at an angle with respect to the plane 1450 such that the line 1456 is disposed at a first alignment (angle α, see FIG. 12E) with respect to the line 1454 defined by the two planes 1450 and 1452.

Figure 12F:
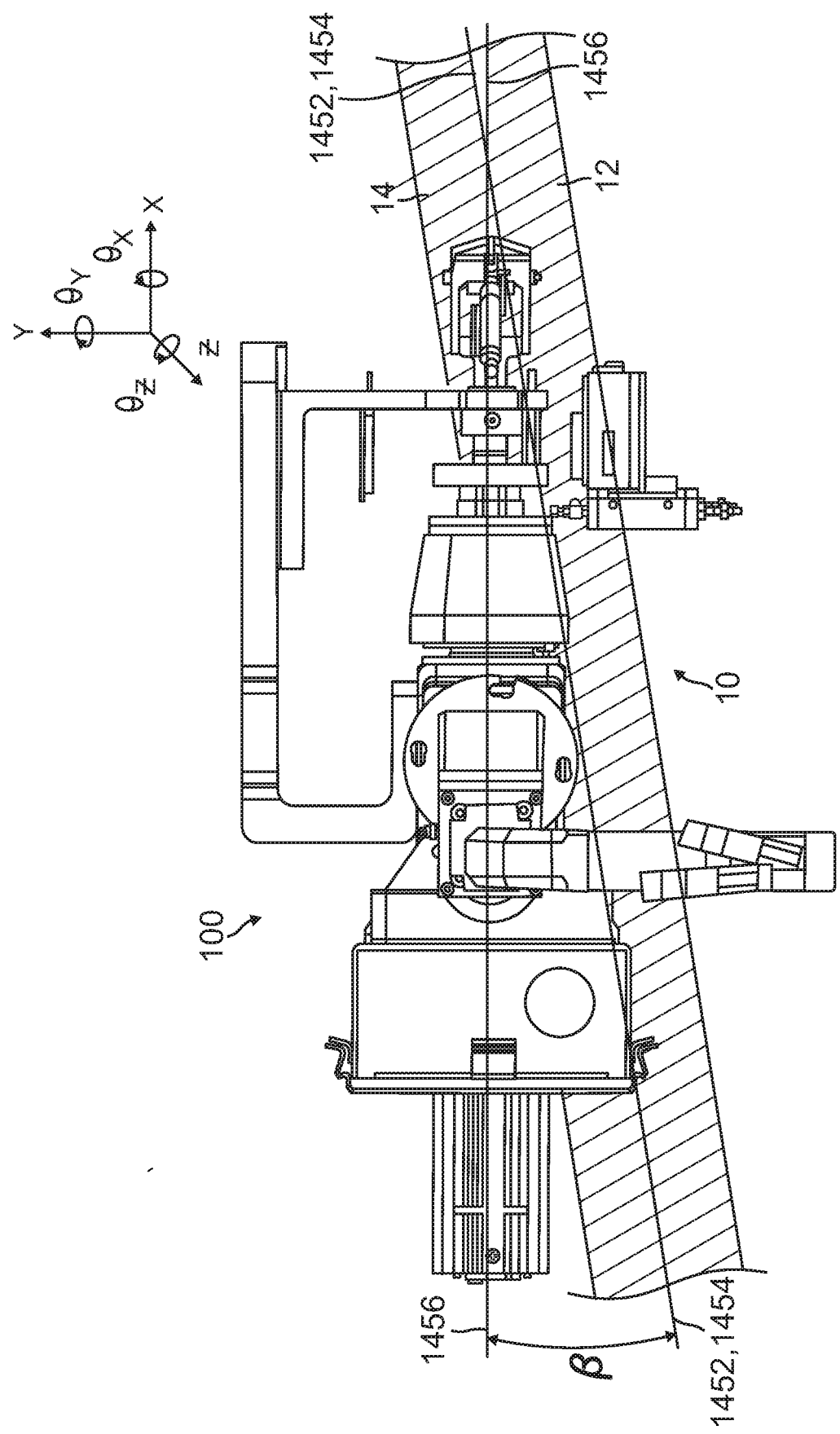
FIG. 12F is a top plan view of the end-effector of FIG. 12E and the underlying composite structural elements.
Figure 12G:
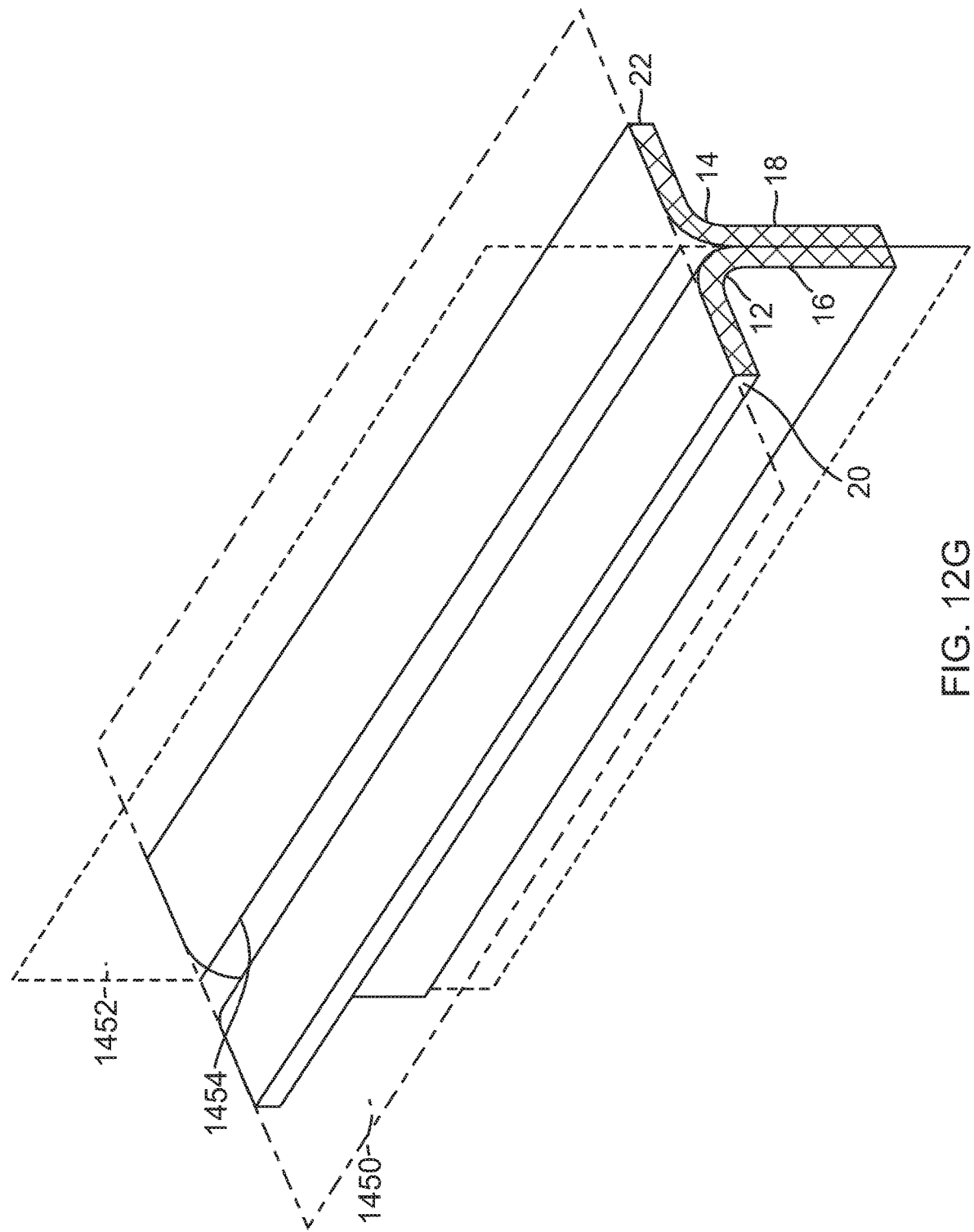
FIG. 12G is a perspective view illustrating the structural members of FIGS. 1A-2D, a pair of planes defined by those structures, and a line defined by the planes.

FIG. 12F is a top plan view of the example end-effector 100 of FIG. 12E, shown disposed above the pair of abutting structural elements 12 and 14. As illustrated in FIG. 12F, the line 1456 through the centroid of the aperture 110 is disposed at a second alignment angle β with respect to the line 1454 defined by the two planes 1450 and 1452, and hence, with respect to the channel 32. As discussed in more detail below, the end-effector 100 can be mounted at the end of an arm of a robot 1300 that is capable of moving the end-effector 100 in six degrees of movement, i.e., ±X, ±Z, ±Θ$_X$, ±Θ$_Y$, and ±Θ$_Z$, where X, Y, and Z are the axes of a conventional orthogonal Cartesian coordinate system, as illustrated in FIGS. 12E and 12F.

If, for example, the X axis is arbitrarily chosen to coincide with the line 1454, then translational movement of the end-effector 100 in the ±X direction corresponds to movement along the line 1454, and hence, along the channel 32. Similarly, translational movement of the end-effector 100 in the ±Y direction corresponds to movement perpendicular to the line 1452, and hence, transverse to the channel 32. Translational movement of the end-effector 100 in the ±Z direction corresponds to vertical movement of the end-effector 100 relative to the channel 32, and so on. In this manner, the first and second alignment angles α and β respectively illustrated in FIGS. 12E and 12F can be varied by rotating the end-effector 100 in the ±Θ$_Y$ and ±Θ$_Z$ directions, respectively, so as to take on any real values. However, as a practical matter, α is typically maintained at a constant value of between about 0 to 90 degrees, whereas, in most embodiments, it is desirable to maintain the second alignment angle β at substantially 0 degrees.

The foregoing positional control of the end-effector 100 in six degrees of movement, i.e., ±X, ±Y, ±Z, ±Θ$_X$, ±Θ$_Y$, and ±Θ$_Z$, can be effected automatically by a feedback control loop 1510 (see FIG. 15) comprising the controller 1502, the machine vision system 130, the robot 1300, and optionally, a carriage 1402 moving along a pair of tracks 1404, as illustrated in FIG. 14. Specifically, the machine vision system 1300 measures the ±X, ±Y, ±Z, ±Θ$_X$, ±Θ$_Y$, and ±Θ$_Z$, position of the end-effector 100, or more particularly, a bead 24 of the filler material 200 leaving the aperture 110 along the line 1456, relative to the position of the channel 32, converts the measurement to an electrical signal provided over feedback loop 1510 to the controller 1502. Using the measurement signal from the machine vision system 130, the controller 1502 determines a control signal represented in FIG. 15 by the portion of feedback loop 1510 between controller 1502 and robot 1300 (e.g., a "difference" signal corresponding to the difference between the position of the bead 24 of filler material 1200 leaving the aperture 110 and that of the channel 32 disposed immediately below the bead 24), and provides such control signal to the robot 1300 over feedback loop 1510 to drive the difference between the two positions to zero.

Additionally, in some embodiments, the machine vision system 130 can be used to adjust the position of a roller mechanism 132 used to compact the bead 24 of filler material 200 into the channel 32. Thus, as illustrated in, FIGS. 3-6, 8, 9, 11, 12A and 12B, the end-effector 100 can advantageously include a roller mechanism 132 that includes a roller 134 movably coupled to, e.g., a support bracket 133 of the end-effector 100, and which is configured to compact the deposited bead 24 of filler material 200 into and flush with the upper surface 1450 of the target channel 32. As illustrated in FIGS. 12A and 12B, the roller mechanism 132 can include a roller 134, a roller support bracket 135, and a first link or arm comprising an actuator 136, e.g., a pneumatic actuator, that has a first end coupled to the roller support bracket 135 through a first hinge 137, and an opposite second end coupled the support bracket 133 by a second hinge 138. The roller mechanism 132 can further include a second arm 139 having a first end rigidly coupled to the roller support bracket 135 and an opposite second end coupled to the support bracket 133 through a third hinge 150. Actuation of the actuator 136 causes the roller 134 to move up and down relative to the front end of the end-effector 100. The machine vision system 130 can thus be configured to operate as a sensor in conjunction with the controller 1502 to control the position of the end-effector 100 relative to the target channel 32, as described above, as well as to control the position of the roller 134 relative to the end-effector 100 via the actuator 136, such that the roller 134 compacts the bead 24 of extruded material into the target channel 32 after it has been deposited into the channel 32 by the end-effector 100, as illustrated in FIG. 14.

In the particular example embodiments illustrated herein, the aperture 110 is shaped like an inverted delta ("Λ"), except with inwardly radiused side walls to conform to corresponding radii in the corresponding side walls of the L-shaped structural members 12 and 14 shown in FIGS. 2A and 2B. As discussed above, the gate 124 acts like a sluice gate or a guillotine blade, in that it partially or completely blocks off or occludes the aperture 110, starting at the top and moving down toward the apex (at the bottom) of the aperture 110, thereby decreasing the functional cross-sectional area of the aperture 110. Since the filler material 200, like water, is relatively incompressible, as the cross-sectional area of the aperture 110, and hence, the cross-sectional area of the bead 24 of filler material 200, decrease, the rate at which the bead 24 of filler material 200 leaves the aperture 110 will increase, all other things remaining the same. This can be compensated for by decreasing the rate at which the screw 104 is rotated within the barrel 102, thereby decreasing the rate at which the bead of filler material 200 is extruded through the aperture 110, or by increasing the rate at which the end-effector 100 is moved along the channel 32, thereby increasing the rate at which the channel 32 is filled with the bead 34, or both.

FIGS. 13 and 14 illustrate an example system 1400 for automatically depositing a bead 24 of filler material 200 into an elongated channel 32 of a composite structure 10 disposed adjacent to the system 1400, such as the composite aircraft stringer 10 of FIGS. 1-2D described above, in which the extruded bead 24 has a cross-sectional profile that can be varied instantaneously to match that of the target channel 32.

As illustrated in FIG. 14, the example system 1400 includes a drive system 1401 comprising a carriage 1402 that is configured to move along rails 1404 disposed adjacent to the structure 10 and channel 32, and a robot 1300 disposed on the carriage 1402 for conjoint movement therewith. As discussed above in connection with FIGS. 12E and 12F and illustrated in FIG. 13, the robot 1300 can include an arm 1302 with a distal end 1304 that is controllably movable by the robot 1300 with six degrees of freedom, i.e., ±X, ±Y, ±Z, ±Θ$_X$, ±Θ$_Y$, and ±Θ$_Z$, relative to the channel 32. The example end-effector 100 described above can be mounted at the distal end 1304 of the arm 1302 such that the end-effector 100, like the distal end 1304 of the arm 1302, is likewise movable by the robot 1300 in six degrees of freedom, i.e., ±X, ±Y, ±Z, ±Θ$_X$, ±Θ$_Y$, and ±Θ$_Z$. Additionally, as discussed above in connection with FIGS. 12E and 12F, it may be recalled that, in some embodiments, movement of the end-effector 100 in the ±X direction can correspond to movement along the channel 32. As discussed above, while this ±X movement can be effected with the robot 1300 under the control of the controller 1502, the machine vision system 130, and, e.g., the feedback loop 1510 (see FIG. 15), in cases where the length of the channel 32 to be traversed by the end-effector 100 in depositing a bead 24 of the filler material 200 exceeds the "reach" of the robot 1300, i.e., the length of its arm 1302, then the ±X movement of the end-effector 100 along the channel 32 can be implemented by disposing the robot 1300 on the carriage 1402 and then effecting ±X movement ("±D(X)") of the end-effector 100 along the channel 32 by moving the carriage 1402 under the control of the controller 1502 and the machine vision system 130.

Figure 15:
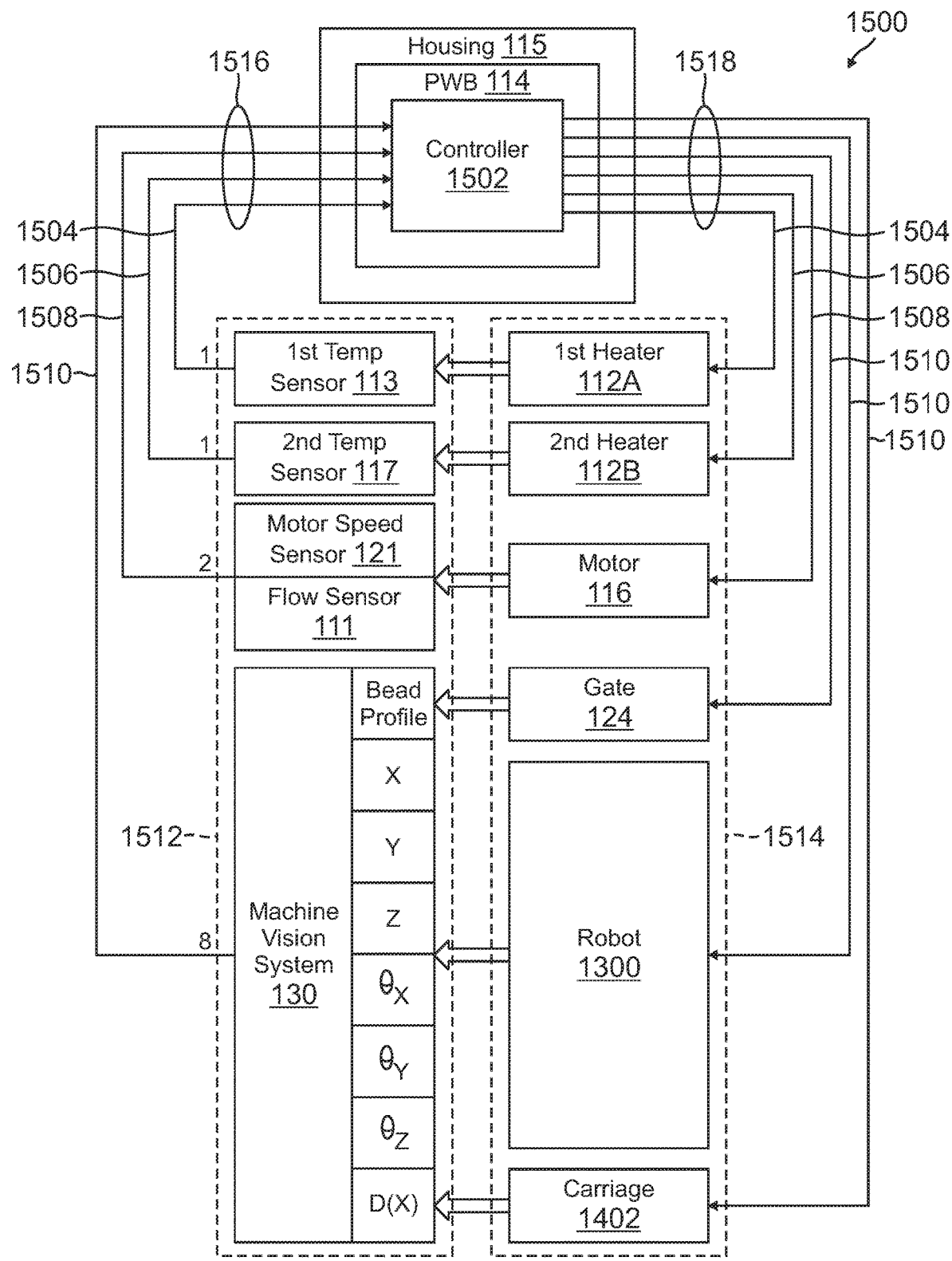
FIG. 15 is a functional block diagram of an example embodiment of a feedback and control system in accordance with the present disclosure.

FIG. 15 is a block diagram of an example embodiment of a feedback control system 1500 of a type contemplated for use in combination with the system 1400. As discussed above in connection with FIG. 11, in one embodiment, the control system 1500 can include a controller 1502 mounted on a common control PCB 114 disposed within a controller housing 115 of the end-effector 100, together with a plurality of closed loops 1504-1510, that serve to couple respective ones of a plurality of sensors 1512, such as the first temperature sensor 113, through the controller 1502, and to respective ones of the various elements 1514 that are controlled by the controller 1502 through associated ones of the feedback loops 1504-1510, such as the first and second heaters 112A and 112B, motor 116, gate 124, and so on. As a practical matter, the controller 1502 can comprise a plurality of individual electrical circuits and associated feedback control loops respectively dedicated to each sensor and associated controlled element. As discussed above, a single sensor, such as the machine vision system 130, can be used to sense more than one parameter, such as the position, i.e., ±X, ±Y, ±Z, ±Θ$_Z$, ±Θ$_Y$, and ±Θ$_Z$, including the alignment angles α and β, of the end-effector 100 relative to the channel 32, and cross-sectional profile of the bead 24, and accordingly, can be associated with a corresponding plurality of the controlled elements 1514 through one or more of the associated feedback loops 1504-1510. Similarly, one or more of the controlled elements 1514, such as the motor 116, can have more than one of the sensors 1512 associated with its automatic control.

Sensor signals from respective ones of the sensors 1512 can be conveyed to the controller 1502 via individual conductive wires disposed in, e.g., a sensor harness 1516, and control signals can be conveyed from the controller 1502 to respective ones of the controlled elements 1514 via individual wires disposed in, e.g., a controller harness 1518. In one advantageous embodiment, the sensor harness 1516 and the control harness 1518 can be combined into a single harness. Other known techniques, including wireless techniques, can also be used in addition to or instead of the individual wires of the harnesses 1520 and 1522 to convey the signals between the sensors 1516, the controller 1502 and the controlled elements 1518.

Figure 16:
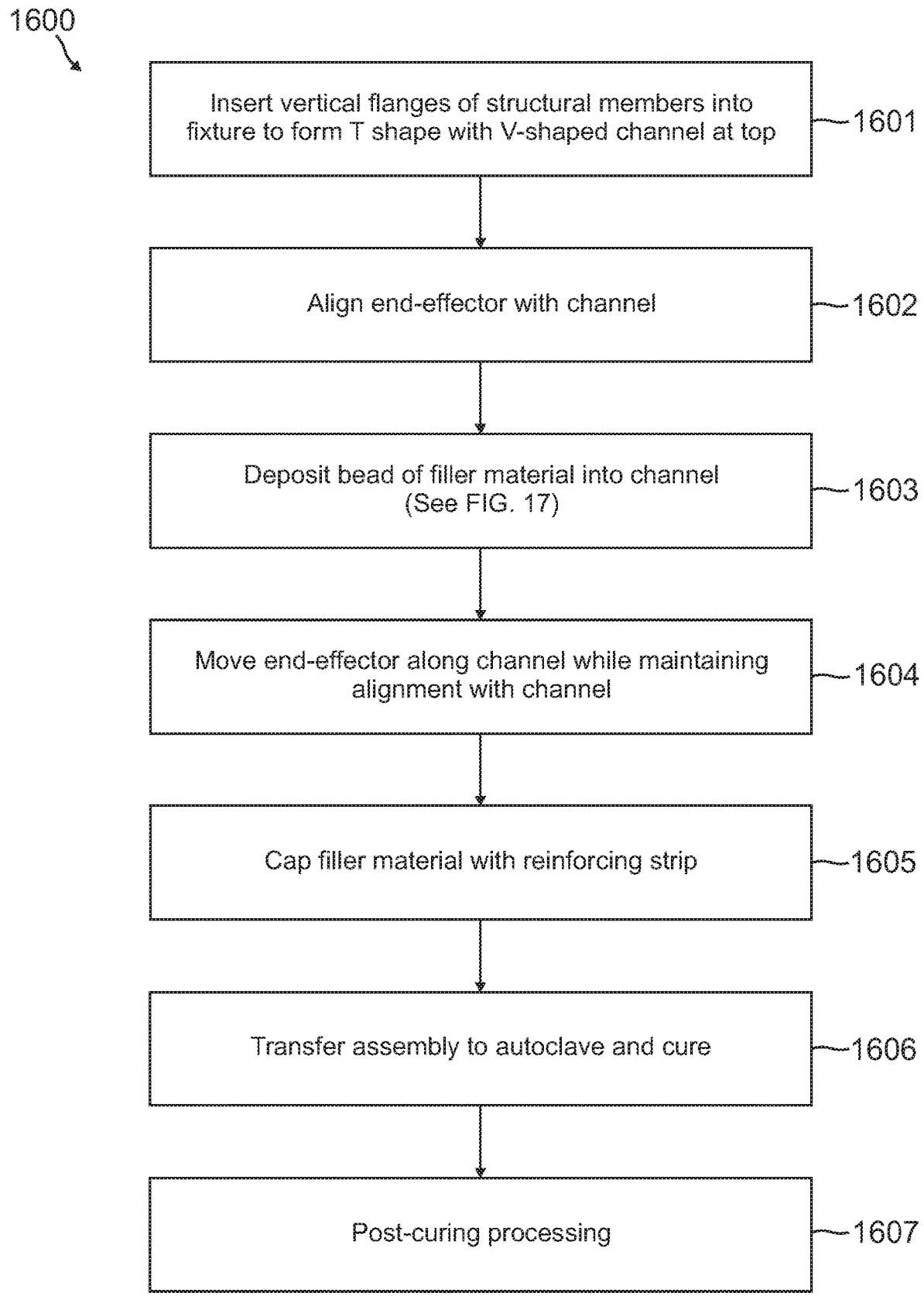
FIG. 16 is a flow diagram of an example method for making the composite structure of FIGS. 1A and 1B using an example end-effector of the present disclosure.

FIG. 16 is a flow diagram of an example method 1600 for making the composite structure 10 of FIGS. 1-2D, and FIG. 17 is a flow diagram of an example method 1700 for using the above system 1400 to make the composite structure 100. As illustrated in FIG. 1, the example method 1600 can begin at step 1601 by clamping the vertical "legs" 16 and 18 of two L-shaped composite structures 12 and 14 in a fixture, such that they are disposed in a back-to-back abutment with each other. As illustrated in the detail view of FIG. 14, their respective horizontal flanges 20 and 22 are then disposed parallel to each other atop the fixture, so as to define the generally V-shaped groove or channel 32 discussed above.

At step 1602 of the method 1600, the example end-effector 100 is aligned with the channel 32, vertically, horizontally, and at the desired angles α and β, using the machine vision system 130 of the end-effector 100 as described above, and at step 1603 of the method 1600, the system 1400 then implements a method 1700 for depositing a bead 24 of filler material 200 into the channel 32. As illustrated in FIG. 16, the step 1603 of depositing the bead 24 of filler material 200 can comprise the example method 1700 outlined in FIG. 17.

Figure 17:
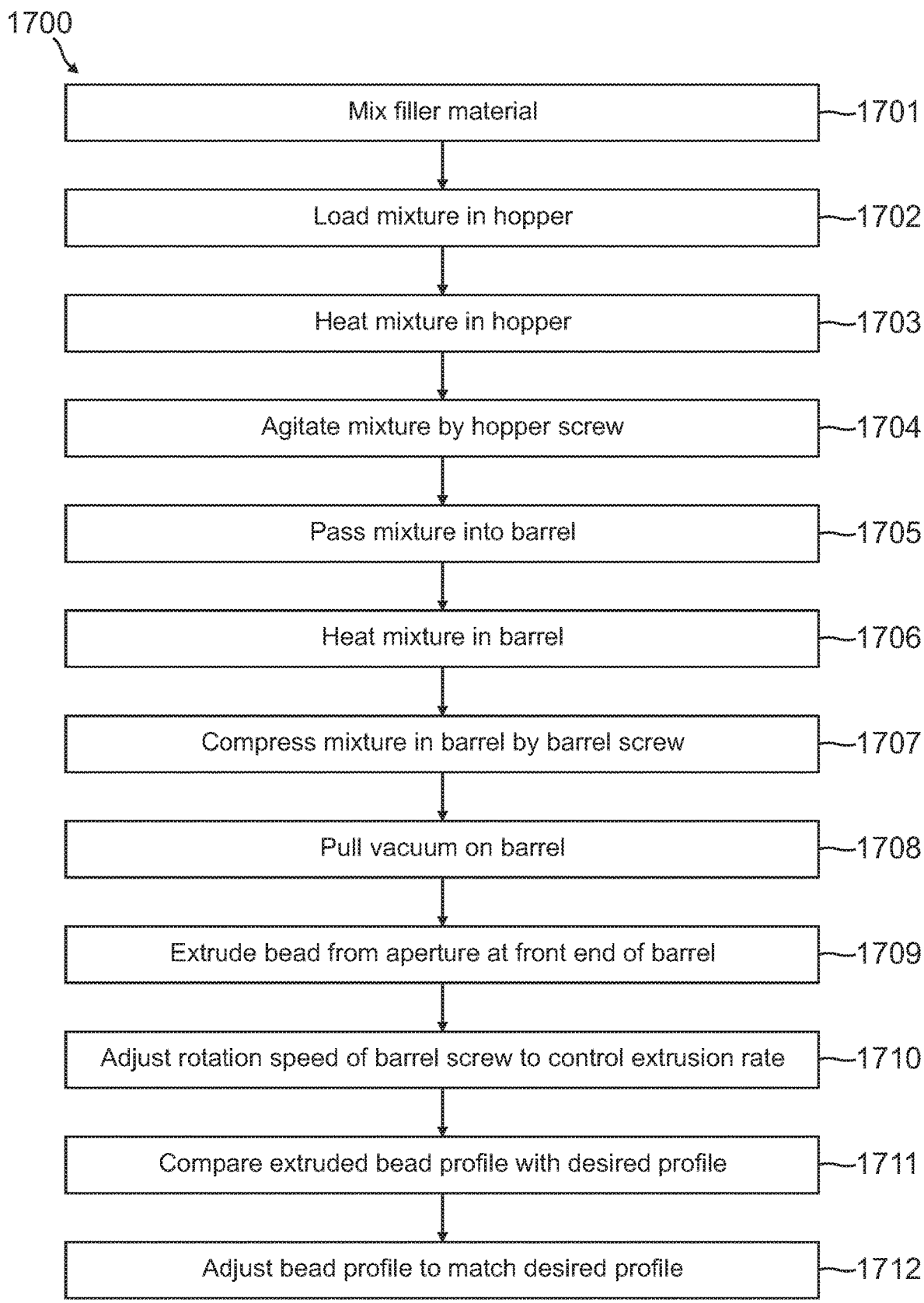
FIG. 17 is a flow diagram of an example method for making a composite structure according to an embodiment of the present disclosure.

Thus, as illustrated in FIG. 17, the example method 1700 can comprise an initial step 1701 of mixing first and second groups 220 and 230 of reinforcing fibers into a liquid or paste-like thermosetting resin 210, in which the fibers of the second group 230 have a length substantially shorter than the length of the fibers of the first group 220. As discussed above in connection with FIG. 2E, this step can also include the blending of other property improving fibers, thixotropic particles, and/or toughening agents into the filler material 200.

At step 1702 of the method 1700, the mixture of filler material 200 is loaded into the hopper 106A or 106B of the end-effector 100, which, as discussed above can comprise either the gravity-feed hopper 106A or the vacuum-assisted, power-feed hopper 106B. Optionally, the method 1700 can then continue at 1703 with the heating of the filler material 200 in the hopper 106A or 106B, which, as discussed above, can be effected with the heater 112A disposed in the hopper 106A or 106B to increase the cure stage of the material. At step 1704, if desired, the second screw 118 located in the power-feed hopper 106B can be rotated to agitate the filler material 200 before, at step 1705, the mixture is pumped into the barrel 102 of the end-effector 100.

At step 1706, the filler material 200 flowing into the barrel 102 can be further heated or cured, if desired, in a second stage using the second heat jacket 112B surrounding the barrel 102. At step 1707, the heated filler material 200 is then compressed forwardly within the barrel 102 by rotating the extrusion screw 104 using the motor 116. As discussed above, at step 1708, a vacuum can be used in cooperation with the powered hopper 106B to help degas and remove voids from the filler material 200 and assist in feeding it into the barrel 104.

At step 1709, the extrusion screw 104 is selectably rotated within in the barrel 102 using the motor 116 to extrude a bead 24 of the filler material 200 through the aperture 110 in response to the rotation. At step 1710, the rotation speed of the screw 104 is adjusted with the motor speed controller 1502 and the motor speed sensor 121 to control the rate of extrusion of the filler material 200. The amount of filler material 200 deposited depends on the gate 124 opening size, the alignment angle and the rate at which the end-effector 100 is moved down the channel 32.

At step 1711 of the method 1700, the machine vision system 130 of the end-effector 100 is used, as described above, to compare the cross-sectional profile of the bead 24 of filler material 200 being extruded from the end-effector 100 with a desired profile, e.g., that of the channel 32 disposed below it. At step 1712, the machine vision system 130 is used to selectively operate the gate actuator 128 and thereby move the gate 124 to conform the applied profile of the bead 24 with the desired profile.

Returning to the description of the example method 1600 of FIG. 16, the method 1600 continues with the at step 1604 of moving the end-effector 100 along the channel 32 using the robot 1300 and the carriage 1402 operating in conjunction with the controller 1502 and the machine vision system 130 so as to deposit the bead 24 of filler material 200 into the channel 32 along its entire length. In this regard, the machine vision system 130 is capable of guiding the end-effector 100 so as to follow any channel 32, which can be continuous or discontinuous, of any shape, even if it has a twist, bend or some other deviation, which is not uncommon, as aircraft are not fabricated of just straight materials, and to deposit a corresponding bead 24 of filler material 200 into that channel 32. As discussed above in connection with FIGS. 1-2D, at step 1605, the compacted bead 24 of filler material 200 and upper surfaces of the flanges 20 and 22 of the L-shaped structural members 12 and 14 can be capped with the third structural member 26.

At step 1606 of the example method 1600, the assembly thus formed can then be transferred to another station, e.g., an autoclave, for curing, and at step 1607, the cured assembly can then be subjected to other post-cure procedures, such as sawing into selected lengths.

Thus, the various steps of the methods 1600 and 1700 of FIGS. 16 and 17 collectively provide a method of in-situ fabricating a composite structure 24. In this regard, a material 200 is received (e.g., step 1702) at an end-effector 100. The material 200 comprises a first group of fibers 220 having a first length 222, a second group of fibers 230 having a second length 232 shorter than the first length, and a resin 210. The end-effector 100 is operated (e.g., steps 1706 and 1707) to orient the first group of fibers 220 in a substantially longitudinal direction relative to the channel 32 when extruded from the end-effector 100 and orient the second group of fibers 230 in substantially random directions when extruded from the end-effector 100. A bead 24 of the oriented filler material 200 is extruded (e.g., step 1709) from the end-effector 100 onto a workpiece (e.g., structural members 12 and 14 defining channel 32). The end-effector 100 is moved relative to the workpiece during the extruding to form the composite structure 24 while a position of the bead 24 relative to the composite structure 24 is detected (e.g., step 1604), and the extruding and moving are adjusted in response to the detected position (e.g., steps 1604 and 1710).

Figure 18:
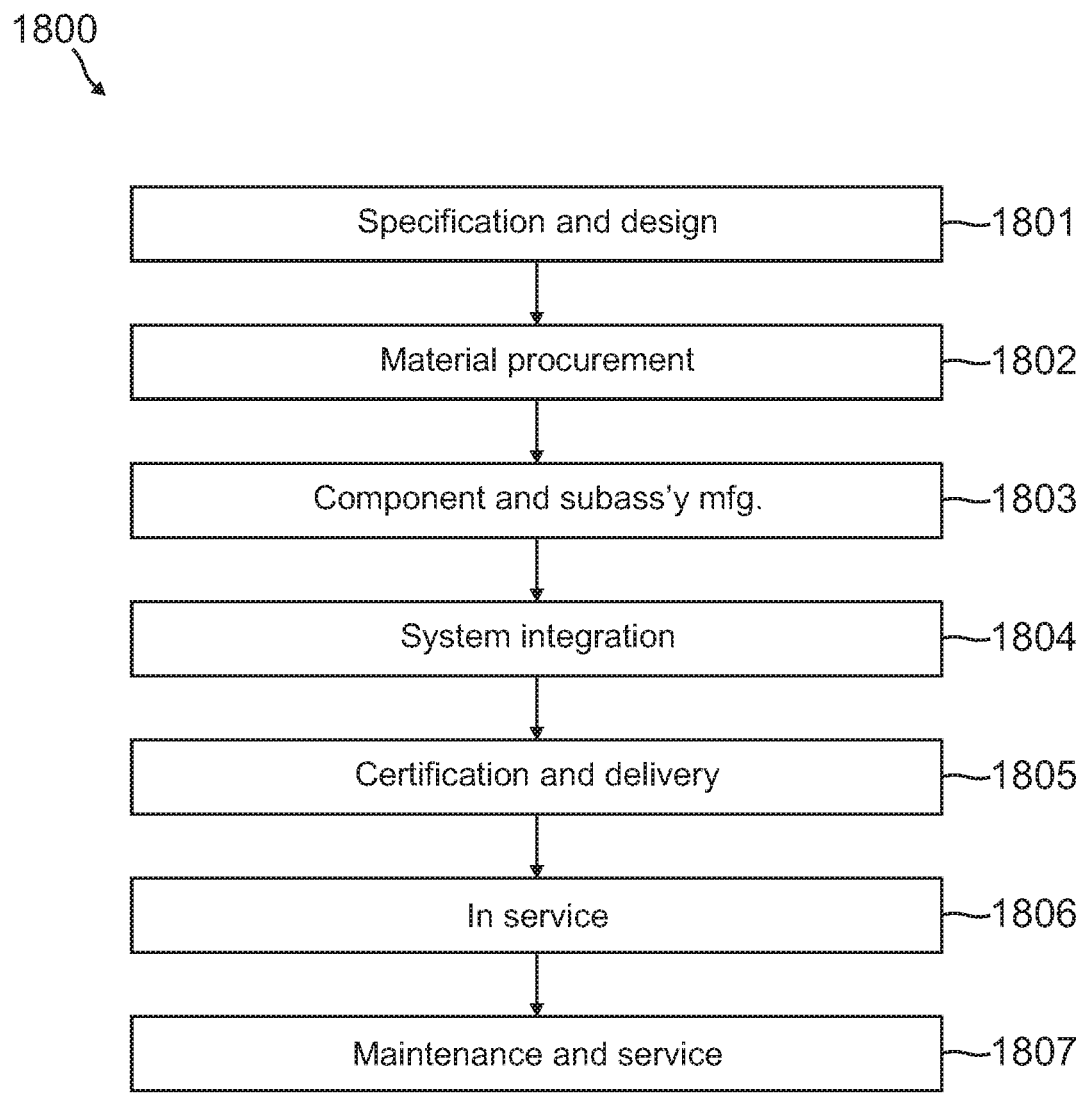
FIG. 18 is a flow diagram of an example embodiment of an aircraft production and service method in accordance with the present disclosure.
Figure 19:
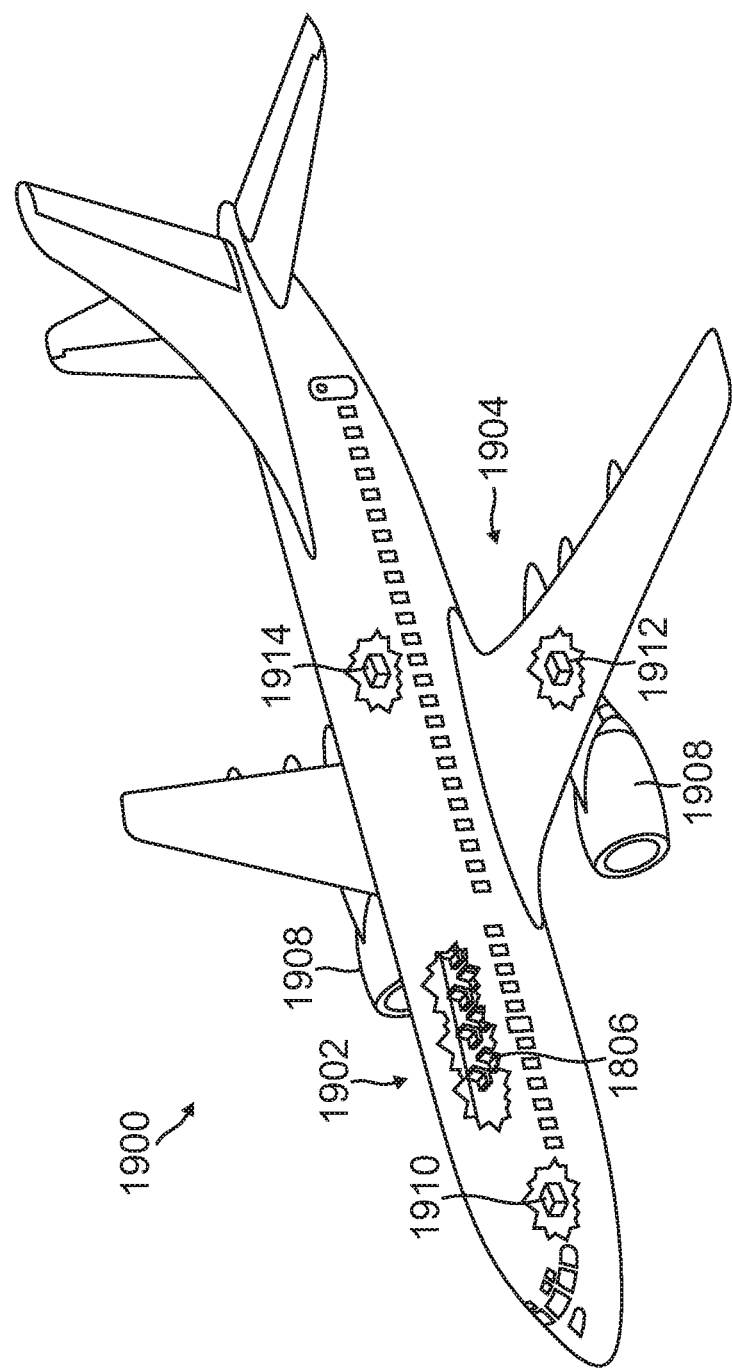
FIG. 19 is a partially cutaway upper, left side perspective view of an aircraft.

Examples of the present disclosure can be described in the context of an aircraft manufacturing and service method 1800, as illustrated in FIG. 18, and in the context of an aircraft 1900, as illustrated in FIG. 19. Thus, during pre-production, the example method 1800 can include a specification and design stage or phase 1801 of the aircraft 1900 and a material procurement phase 1802. During production, a component and subassembly manufacturing phase 1803 and a system integration phase 1804 of the aircraft 1900 can take place. Thereafter, the aircraft 1900 can go through a certification and delivery phase 1805 preparatory to being placed in service at 1806. While in service, the aircraft 1900 can be scheduled for a routine maintenance and service phase 1707. The routine maintenance and service phase 1807 can include modification, reconfiguration, refurbishment, etc., of one or more systems of the aircraft 1900. The example system 1400 can be used on 1803, 1804, 1807, 1902, and 1906.

Each of the processes of the example method 1800 above can be performed or carried out by a system integrator, a third party, and/or an operator (e.g., a customer). For the purposes of this description, a "system integrator" can include, without limitation, any number of aircraft manufacturers and major-system subcontractors; a "third party" can include, without limitation, any number of vendors, subcontractors, and suppliers; and an "operator" can include an airline, leasing company, military entity, service organization, and so on. For example, various aspects disclosed herein can be utilized during one or more of the phases 1802, 1803, or 1804 of the method 1800, and/or in connection with one or more of the elements 1902 or 1904 of the aircraft 1900 described below.

As illustrated in FIG. 19, the aircraft 1900 produced, maintained and upgraded by the example method 1800 can include an airframe 1902 with a plurality of high-level systems 1904 and an interior 1906. Examples of the high-level systems 1904 can include one or more of a propulsion system 1908, an electrical system 1910, a hydraulic system 1912, and an environmental system 1914. Any number of other systems can also be included. Although an aerospace example is illustrated in the figures, the principles disclosed herein can be applied in a similar manner to other industries, such as the automotive industry. Accordingly, in addition to the aircraft 1900, the principles disclosed herein can apply to other vehicles, e.g., land vehicles, marine vehicles, space vehicles, and so on.

The example systems and methods shown and described herein can be employed during any one or more of the stages of the manufacturing and service method 1800. For example, components or subassemblies corresponding to component and subassembly manufacturing phase 1803 can be fabricated or manufactured in a manner similar to the components or subassemblies produced while the aircraft 1900 is in service. Also, one or more examples of the systems, methods, or combinations thereof can be utilized during the production phase 1803 and 1804 of the method 1800, for example, by substantially expediting assembly or reducing the cost of the aircraft 1900. Similarly, one or more examples of the apparatus or method realizations, or a combination thereof, can be utilized, for example and without limitation, while the aircraft 1900 is in service, e.g., in the maintenance and service phase 1807.

As those of some skill in this art will understand, the systems and methods described herein are not limited to the fabrication of various types of vehicles. They are also fully applicable, with suitable modifications, to the manufacture of, for example, composite pressure vessels, such as dive tanks, and composite casings for, e.g., solid rocket engines.

Indeed, as those of skill will by now appreciate, and depending on the particular application at hand, many modifications, substitutions and variations can be made in and to the materials, apparatus, configurations and methods of the present disclosure without departing from the spirit and scope thereof. In light of this, the scope of the present invention should not be understood as being limited to those of the particular embodiments illustrated and described herein, as they are merely by way of some examples thereof, but rather, should be fully commensurate with that of the claims appended hereafter and their functional equivalents.

What is claimed is:

1. A method of in-situ fabricating a composite structure in a channel, the method comprising:
   receiving a filler material within a barrel of an end-effector, wherein the filler material comprises a first group of fibers, a second group of fibers, and a resin;
   applying a vacuum within the barrel of the end-effector to assist in the receiving of the filler material within the barrel;
   operating the end-effector, wherein the operating comprises orienting the first group of fibers in a substantially longitudinal direction relative to the channel when extruded from the end-effector and orienting the second group of fibers in substantially random directions relative to the channel when extruded from the end-effector by rotating a helical extrusion screw within the barrel such that a thread of the screw rotates relative to an interior wall surface of the barrel;
   extruding a bead of the oriented filler material from the end-effector into the channel.

2. The method of claim 1, wherein:
   the receiving comprises receiving the filler material at an aft aperture at an aft end of a barrel of the end-effector;
   the operating further comprises rotating the helical extrusion screw disposed within the barrel by a motor of the end-effector to compress the filler material within the barrel and heating the filler material in the barrel; and
   the extruding comprises passing the oriented filler material through a front aperture at a front end of the barrel.

3. The method of claim 1, further comprising:
   heating the filler material in the barrel, wherein the pulling the vacuum from the end-effector removes gasses generated from the heated filler material within the barrel.

4. The method of claim 1, further comprising:
   detecting a flow rate of the bead from a front aperture; and
   adjusting an amount of the vacuum in response to the detected flow rate.

5. The method of claim 1, further comprising detecting a position of the bead relative to the channel and adjusting an orientation of a front aperture relative to the channel in response to the detected position to align the bead in the channel.

6. The method of claim 2, further comprising detecting a profile of the bead.

7. The method of claim 6, further comprising adjusting operation of the motor in response to the detected profile to adjust a compression exerted by the helical extrusion screw on the filler material to conform the detected profile to a desired profile.

8. The method of claim 6, further comprising adjusting the heating in response to the detected profile to adjust a temperature of the filler material to conform the detected profile to a desired profile.

9. The method of claim 6, further comprising adjusting a translation speed corresponding to a moving of the end-effector in response to the detected profile to conform the detected profile to a desired profile.

10. The method of claim 6, further comprising moving a gate across the front aperture to selectively occlude the front aperture to conform the detected profile with a desired profile.

11. The method of claim 2, wherein the front aperture has a cross-sectional profile corresponding to a cross-sectional profile of the bead.

12. The method of claim 2, further comprising:
    detecting a flow rate of the bead from the front aperture; and adjusting a rotation speed of the motor in response to the detected flow rate to adjust a compression exerted by the helical extrusion screw on the filler material.

13. The method of claim 2, further comprising:
detecting a temperature of the filler material in the barrel; and
adjusting the heating in response to the detected temperature.

14. The method of claim 2, wherein the receiving comprises receiving the filler material from a hopper in fluid communication with the aft aperture.

15. The method of claim 14, further comprising heating the filler material in the hopper.

16. The method of claim 15, further comprising:
detecting a flow rate of the bead from the front aperture; and
adjusting the heating of the barrel and the hopper in response to the detected flow rate.

17. The method of claim 15, wherein:
the filler material in the hopper is heated to a temperature of approximately 140 degrees Fahrenheit; and
the filler material in the barrel is heated to a temperature of approximately 190 degrees Fahrenheit.

18. The method of claim 15, further comprising:
detecting a first temperature of the filler material in the hopper;
detecting a second temperature of the filler material in the barrel; and
selectively adjusting the heating in response to the detected first and second temperatures.

19. The method of claim 14, wherein the helical extrusion screw comprises a first screw, and further comprising agitating the filler material by a second screw in the hopper before the filler material passes into the barrel.

20. The method of claim 1, wherein the channel is of an aircraft stringer and wherein the composite structure is a noodle of the aircraft stringer.

21. The method of claim 1, further comprising:
moving the end-effector relative to the channel during the extruding to form the composite structure;
detecting a position of the bead relative to the channel; and
selectively adjusting the extruding and the moving in response to the detected position.

22. The method of claim 21, wherein the end-effector is disposed on an arm of a robot and wherein the moving comprises moving the robot on a carriage relative to the channel.

23. The method of claim 1, wherein the first group of fibers have a first length and the second group of fibers have a second length shorter than the first length.

24. A method of in-situ fabricating a composite structure, the method comprising:
receiving a material at an end-effector, wherein the material comprises a first group of fibers, a second group of fibers, and a resin;
applying a vacuum within the end-effector to assist in the receiving of the filler material at the end effector;
operating the end-effector, wherein the operating comprises orienting the first group of fibers in a substantially longitudinal direction relative to a channel when extruded from the end-effector and orienting the second group of fibers in substantially random directions when extruded from the end-effector to form an orientated filler material;
extruding a bead of the oriented filler material from the end-effector onto a workpiece;
moving the end-effector relative to the workpiece during the extruding to form the composite structure.

25. The method of claim 24, wherein first fibers in the first group of fibers have a first length and second fibers in the second group of fibers have a second length that is shorter than the first length.

* * * * *